(12) United States Patent
Dahle et al.

(10) Patent No.: US 7,924,524 B2
(45) Date of Patent: Apr. 12, 2011

(54) SYSTEM AND METHOD FOR GENERATING AN AMPLITUDE ERROR SIGNAL IN A MAGNETIC TAPE RECORDING CHANNEL

(75) Inventors: Jacob Lee Dahle, Tucson, AZ (US); Robert Allen Hutchins, Tucson, AZ (US); Sedat Oelcer, Kilchberg (CH); Larry LeeRoy Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 12/351,432

(22) Filed: Jan. 9, 2009

(65) Prior Publication Data

US 2010/0177427 A1 Jul. 15, 2010

(51) Int. Cl.
*G11B 5/035* (2006.01)

(52) U.S. Cl. .............................. 360/65; 360/46; 375/232

(58) Field of Classification Search ........................ None
See application file for complete search history.

(56) References Cited

U.S. PATENT DOCUMENTS

| | | | | |
|---|---|---|---|---|
| 5,375,145 A * | 12/1994 | Abbott et al. | ................. | 375/345 |
| 5,422,601 A | 6/1995 | Kovacs et al. | ................. | 330/279 |
| 5,424,881 A | 6/1995 | Behrens et al. | ................. | 360/40 |
| 5,784,356 A | 7/1998 | Hayashi et al. | ............... | 369/124 |
| 5,877,644 A * | 3/1999 | Christensen et al. | ......... | 327/321 |
| 6,608,524 B2 | 8/2003 | Kawabe et al. | | |
| 6,930,553 B2 | 8/2005 | Takahashi | | |
| 7,206,366 B2 | 4/2007 | Fujimori et al. | | |
| 7,212,482 B2 | 5/2007 | Howarth et al. | ........... | 369/59.15 |
| 7,263,123 B2 | 8/2007 | Yousef | | |
| 7,436,609 B2 | 10/2008 | Hutchins | ........................ | 360/46 |
| 7,495,854 B2 * | 2/2009 | Hutchins et al. | ................. | 360/46 |
| 7,778,554 B2 | 8/2010 | Levinson et al. | | |

OTHER PUBLICATIONS

"A 27 Mhz Mixed Analog/Digital Magnetic Recording Channel DSP Using Partial Response Signaling with Maximum Likelihood Detection", IEEE International Solid-state Circuits Conference, pp. 136-137, T. J. Schmerback, R. A. Richetta, L. D. Smith, 1991.
U.S. Appl. No. 12/351,403, filed Jan. 9, 2009.
U.S. Appl. No. 12/351,464, filed Jan. 9, 2009.
Non-Final Office Action Summary from U.S. Appl. No. 12/351,403 mailed on Jun. 10, 2010.
Non-Final Office Action Summary from U.S. Appl. No. 12/351,403 mailed on Sep. 9, 2010.
Non-Final Office Action Summary from U.S. Appl. No. 12/351,464 mailed on Aug. 31, 2010.

(Continued)

*Primary Examiner* — Jason C Olson
(74) *Attorney, Agent, or Firm* — Zilka-Kotab, PC

(57) ABSTRACT

A method according to one embodiment includes generating a first gain error, comprising: receiving an output of an equalizer; and comparing a magnitude of the output to a saturation threshold level; if the output is higher than the saturation threshold level, generating a first gain error. The method further including generating at least one of a second and a third gain error, wherein generating the second gain error comprises: using either a slicer or a trellis for generating the second gain error, wherein the slicer generates a gain error based on an output of an interpolator, wherein the trellis generates a gain error based on an output of a maximum likelihood detector; wherein generating the third gain error comprises: receiving an output of an equalizer; generating a threshold qualified peak from the equalizer output and a tracking threshold level; comparing the threshold qualified peak to a second threshold; and generating a third gain error based on the comparison.

23 Claims, 22 Drawing Sheets

OTHER PUBLICATIONS

Non-Final Office Action Summary from U.S. Appl. No. 12/351,464 dated Dec. 20, 2010.

Non-Final Office Action Summary from U.S. Appl. No. 12/351,403 dated Feb. 9, 2011.

* cited by examiner

US 7,924,524 B2

SYSTEM AND METHOD FOR GENERATING AN AMPLITUDE ERROR SIGNAL IN A MAGNETIC TAPE RECORDING CHANNEL

BACKGROUND

The present invention relates to data storage systems, and more particularly, this invention relates to gain control systems and methods.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium as well as read-back speed. For tape storage systems, that goal has lead to increasing the track density on recording tape, and increasing the per-channel bit rate. However, the development of small footprint, higher performance tape drive systems has created various problems in the design of such tape systems.

SUMMARY

A method according to one embodiment includes generating a first gain error, comprising: receiving an output of an equalizer; and comparing a magnitude of the output to a saturation threshold level; if the output is higher than the saturation threshold level, generating a first gain error. The method further including generating at least one of a second and a third gain error, wherein generating the second gain error comprises: using either a slicer or a trellis for generating the second gain error, wherein the slicer generates a gain error based on an output of an interpolator, wherein the trellis generates a gain error based on an output of a maximum likelihood detector; wherein generating the third gain error comprises: receiving an output of an equalizer; generating a threshold qualified peak from the equalizer output and a tracking threshold level; comparing the threshold qualified peak to a second threshold; and generating a third gain error based on the comparison.

A method according to another embodiment includes receiving an output of an equalizer; and comparing a magnitude of the output to a saturation threshold level; if the output is higher than the saturation threshold level, generating a gain error.

A method according to another embodiment includes receiving an output of an equalizer; generating a threshold qualified peak from the equalizer output and a tracking threshold level; comparing the threshold qualified peak to a second threshold; and generating a gain error based on the comparison.

A system for generating gain errors according to one embodiment includes logic for receiving an output of an equalizer; logic for comparing a magnitude of the output to a saturation threshold level; and logic for generating a first gain error if the output is higher than the saturation threshold level; either a slicer or a trellis for generating a second gain error, wherein the slicer generates a gain error based on an output of an interpolator, wherein the trellis generates a gain error based on an output of a maximum likelihood detector.

A system for generating gain errors according to another embodiment includes logic for receiving an output of an equalizer; logic for comparing a magnitude of the output to a saturation threshold level; logic for generating a first gain error if the output is higher than the saturation threshold level; logic for generating a threshold qualified peak from the equalizer output and a tracking threshold level; logic for comparing the threshold qualified peak to a second threshold; and logic for generating a third gain error based on the comparison of the threshold qualified peak and the second threshold.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
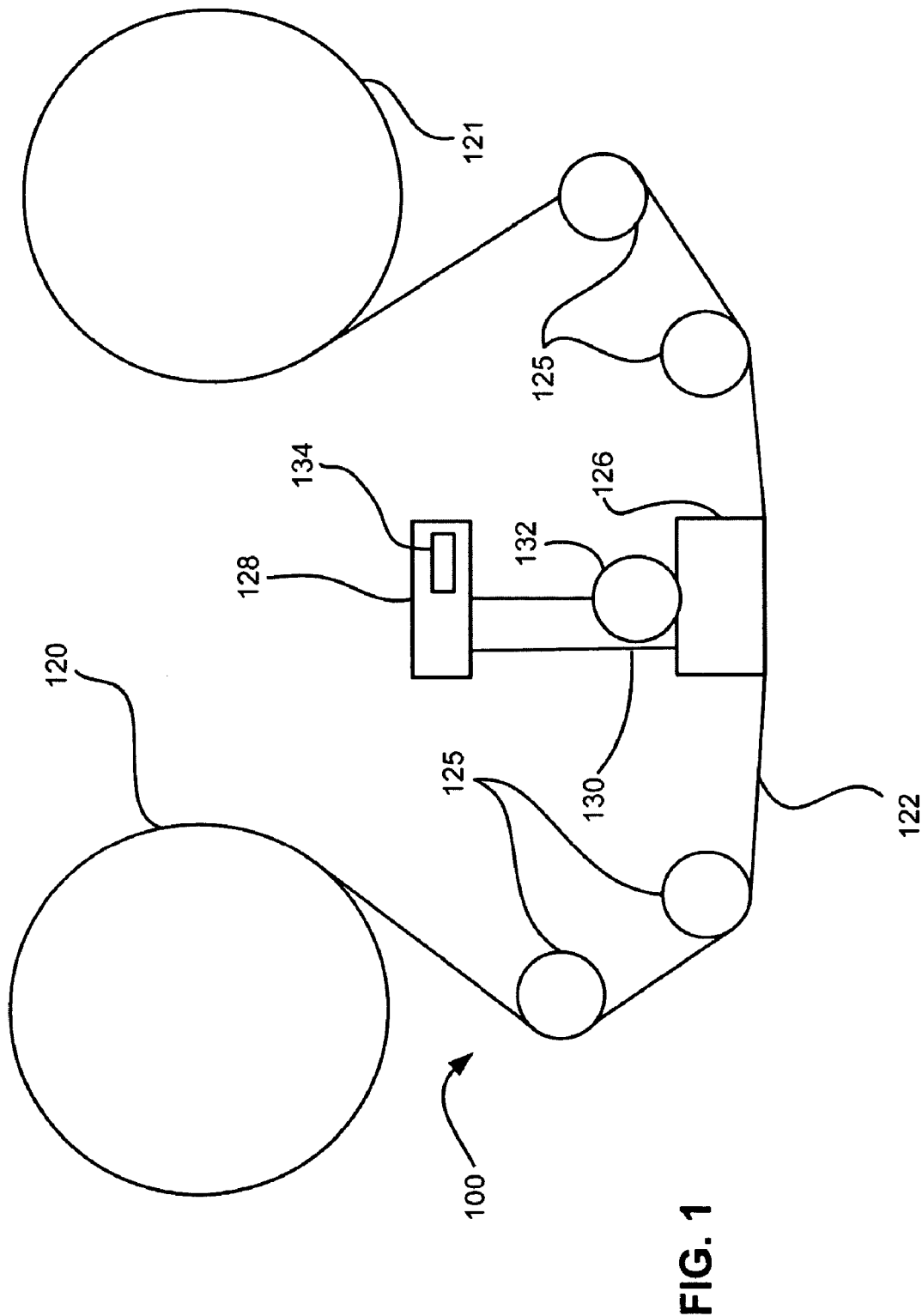
FIG. 1 is a schematic diagram of a simplified tape drive system, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a method includes generating a first gain error, comprising: receiving an output of an equalizer; and comparing a magnitude of the output to a saturation threshold level; if the output is higher than the saturation threshold level, generating a first gain error. The method further including generating at least one of a second and a third gain error, wherein generating the second gain error comprises: using either a slicer or a trellis for generating the second gain error, wherein the slicer generates a gain error based on an output of an interpolator, wherein the trellis generates a gain error based on an output of a maximum likelihood detector; wherein generating the third gain error comprises: receiving an output of an equalizer; generating a threshold qualified peak from the equalizer output and a tracking threshold level; comparing the threshold qualified peak to a second threshold; and generating a third gain error based on the comparison.

In another general embodiment, a method includes receiving an output of an equalizer; and comparing a magnitude of the output to a saturation threshold level; if the output is higher than the saturation threshold level, generating a gain error.

In another general embodiment, a method includes receiving an output of an equalizer; generating a threshold qualified peak from the equalizer output and a tracking threshold level; comparing the threshold qualified peak to a second threshold; and generating a gain error based on the comparison.

In another general embodiment, a system for generating gain errors includes logic for receiving an output of an equalizer; logic for comparing a magnitude of the output to a saturation threshold level; and logic for generating a first gain error if the output is higher than the saturation threshold level; either a slicer or a trellis for generating a second gain error, wherein the slicer generates a gain error based on an output of an interpolator, wherein the trellis generates a gain error based on an output of a maximum likelihood detector.

In another general embodiment, a system for generating gain errors includes logic for receiving an output of an equalizer; logic for comparing a magnitude of the output to a saturation threshold level; logic for generating a first gain error if the output is higher than the saturation threshold level; logic for generating a threshold qualified peak from the equalizer output and a tracking threshold level; logic for comparing the threshold qualified peak to a second threshold; and logic for generating a third gain error based on the comparison of the threshold qualified peak and the second threshold.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

As mentioned above, in a magnetic recording tape drive, data is recovered by passing the magnetic media over the recording head. The signals received from the head are analog signals representing data written on the tape. Typically, these signals are converted to 8-bit wide digital signals by an analog-to-digital converter (ADC) and then input into a read-detect channel. The read-detect channel processes these digital signals and reconstructs the original data that was written on tape.

Depending upon the recording head and the magnetic media, the amplitude of the signals received from the tape can vary dramatically. The analog signal is normally either amplified or attenuated to keep the analog signal within the operating range of the analog-to-digital converter. If the signal is too large, peaks of the signal may be truncated. If the signal is too small, the signal may be lost in the quantization noise.

Similarly, as the final block in the read-detect channel, a maximum likelihood detector or a partial response maximum likelihood (PRML) detector may be used to determine the binary sequence that was written on tape. In most cases, the maximum-likelihood detector is very sensitive to the signal amplitude. For example, a read-back signal may be perfectly recovered, but if the amplitude is too large or too small, systematic errors may occur and the data may be decoded incorrectly.

Thus, signal gain control allows the controlling of the amplitude of the signal for quantization by the ADC and the controlling of the amplitude of the digital read-back signal at the input to the maximum likelihood detector for data detection.

In some cases, modulation code is utilized for tape drives that create special properties in the signals that are read from the tape and/or attempts to improve the data efficiency. In some cases, the modulation code does not guarantee isolated peaks. As a result, the signal amplitude might be low for an extended period, based upon the recorded data.

For a read-detect channel, it is often undesirable to change the gain based upon the data pattern that was written. In most cases, it is desirable to only adjust the gain if the amplitude of the signal has changed. Accordingly, in one embodiment, a gain control system is provided such that a front-end gain control block uses a signal from a maximum likelihood detector in order to make decisions about the signal amplitude. A dual gain control block strategy is utilized; however, the front-end gain control block may adjust the gain based upon knowledge of data that is written on a tape. With this architecture, a low-bandwidth amplitude gain control (AGC) block will not adjust the gain based upon a data pattern, thus maintaining a constant gain at an input to an ADC.

In this way, precise, high-speed gain control with the all-digital AGC may be maintained. Furthermore, the gain control system is insensitive to the data pattern that is written on tape and yet the high-bandwidth digital AGC is still very responsive, allowing compensation for fast variations in the signal amplitude.

Figure 2:
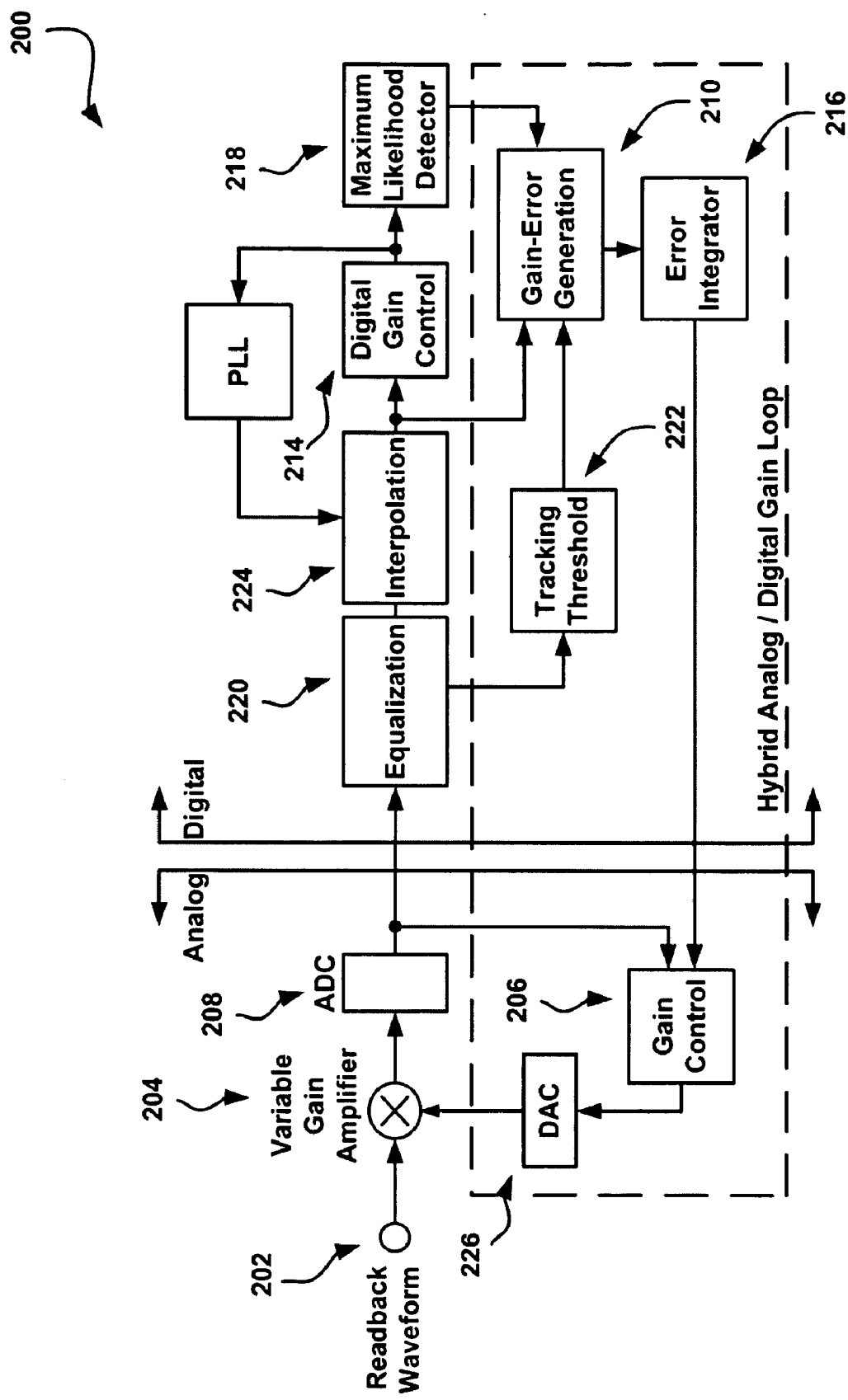
FIG. 2 shows a dual gain control system for gain control, in accordance with one embodiment.

FIG. 2 shows a dual gain control system 200 for gain control, in accordance with one embodiment. As an option, the present system 200 may be implemented in the context of the details of FIG. 1. Of course, however, the system 200 may be implemented in any desired environment.

As shown, the system 200 includes an analog input 202 for receiving an analog signal (e.g. a read-back waveform, etc.), and a variable gain amplifier 204 coupled to the analog input 202. Additionally, a first gain control circuit 206 is coupled to the variable gain amplifier 204 for controlling the gain of the analog signal. An analog to digital converter 208 is also provided for converting the analog signal to a digital signal.

In one embodiment, a first gain error generation circuit (not shown) may be provided for generating a first gain error signal based on an output of the analog to digital converter 208. In this case, the first gain error signal, or derivative thereof, may be received by the first gain control circuit 206. Additionally, a second gain error generation circuit 210 may be provided for generating a second gain error signal based on the digital signal. In this case, the second gain error signal, or derivative thereof, is received by the first gain control circuit 206. The first gain control circuit 206 may then use at least one of the gain error signals to control the gain of the analog signal.

As an option, a digital gain control circuit 214 may also be included. In this case, the digital gain control circuit 214 may be utilized for applying a gain to the digital signal at some point on the path through the overall circuit. As used herein, the term "digital signal" refers to any digital signal that may be processed prior to reaching the digital gain control.

As another option, a first error integrator 216 may be provided. In operation, the first error integrator 216 may be utilized for receiving the gain error signal and generating a derivative signal from the gain error signal.

In one embodiment, the first gain control circuit 206 may include a second integrator (not shown in FIG. 2) in the first gain control block 206. In this case, the second integrator may be utilized for receiving the signal at the output of the ADC, or a derivative thereof, and using the derivative signal for controlling the gain of the analog signal.

It should be noted that the first gain error signal may be used during an acquisition period occurring at least prior to the system 200 locking onto data in the digital signal. In this case, the second gain error signal may be used during a tracking period following the acquisition period. It should also be noted that, the second gain error signal may be based on an output of a maximum likelihood detector 218 included in the system 200. In this case, a mode of operation may specify that the second gain error signal is to be based on the output of the maximum likelihood detector 218.

In operation, the system 200 may be utilized to receive an analog signal, convert the analog signal to a digital signal, and to process the digital signal. Furthermore, the processed digital signal may be analyzed for generating a gain error signal. A control signal may then be generated based on the gain error signal.

This control signal may be used to adjust a gain of the analog signal. In one embodiment, the adjustment of the gain of the analog signal may be based on the system 200 being in a first mode (e.g. an acquisition mode). In this case, the adjustment of the gain of the analog signal in the first mode may be based on whether peak values of an equalized waveform of the digital signal exceed a threshold. The equalized waveform may be an equalized waveform of a tape read-back signal, for example.

In another embodiment, the adjustment of the gain of the analog signal may be based on the system 200 being in a second mode (e.g. a tracking mode). In this case, the adjustment of the gain of the analog signal in the second mode may be based on the output of the maximum likelihood detector 218, as mentioned above. Additionally, a gain of the processed digital signal may be adjusted.

The first gain control circuit 206 may include gain control logic to drive the low-bandwidth variable gain amplifier 204. In one embodiment, the system 200 may be capable of operating in various modes of operation. For example, the modes of operation may include an all digital operation, a hybrid analog/digital operation, and an all analog operation.

In this case, all of the gain control loops are digital except for the variable gain amplifier 204, a digital to analog converter 226, and the analog to digital converter 208. The term analog mode of operation refers to the use of analog circuitry and digital logic that has been partitioned into the front-end module. The front-end module includes both analog and digital circuitry.

The term digital mode of operation refers to the use of back-end digital module to control the analog gain control loop. In this case, the backend digital module includes only digital logic. Furthermore, in the digital mode of operation, the analog gain control loop is primarily controlled by the logic contained in the back-end digital module.

In hybrid analog/digital operation, the analog gain control is controlled by the digital back-end module during tracking and by the analog/digital front-end module during acquisition. All modes of operation may use the analog circuits such as the variable gain amplifier 204, the digital to analog converter 226, and the analog to digital converter 208. Additionally, all loops also use digital logic to control the system.

Further, the modes of operation may include submodes, such as an acquisition mode and a tracking mode. These submodes typically correspond to two basic states of the system 200, an asynchronous state and a synchronous state. In an asynchronous state or mode of operation, the system 200 has no knowledge about data written on the tape because the channel is not locked to the data. In the asynchronous mode, signals are being received but the amplitude and the phase of the signals is not precisely known. In a synchronous state or mode of operation, the system 200 is locked to the data and the channel has knowledge about data written on the tape. In the synchronous mode, data is being detected and an accurate estimate of the received signal can be derived.

When the system 200 is in an "analog mode," it operates asynchronously during both the tracking and acquisition modes and the system has no knowledge about the actual data being read. The first gain control circuit 206 is utilized to adjust the amplitude of the signal, based upon the peak amplitude information available in the digitized waveform. Additionally, during asynchronous or acquisition operation in the "analog mode" of operation, the first gain control circuit 206 should have a high gain. In this acquisition mode, the first gain control circuit 206 adjusts the gain rapidly to a correct value, based upon the information received. Similarly, the first gain control circuit 206 should have a low gain during tracking mode. In this tracking mode, the first gain control circuit 206 should adjust slowly, filtering out any unwanted noise before making gain adjustments.

When the system 200 is in an "analog/digital hybrid mode," it operates asynchronously during acquisition and synchronously during tracking. During acquisition, the system has no knowledge about the data being read. During tracking, the system uses data from the maximum likelihood detector 218 to make decisions about the signal gain. In the acquisition mode, the first gain control circuit 206 is utilized to adjust the amplitude of the signal, based upon the peak amplitude information available in the analog front-end module. Additionally, during asynchronous or acquisition mode of the "analog mode" or "analog/digital hybrid mode" of operation, the first gain control circuit 206 should have a high gain. The first gain control circuit 206 should adjust the gain rapidly to a correct value, based upon the information received in the front-end module. During the synchronous or tracking mode, the gain control system should have a low gain. In this tracking mode, the gain control system responds slowly, filtering out any unwanted noise.

In the all-digital mode of operation, during the asynchronous or acquisition mode, an equalized waveform output from the equalization module 220, and a tracking threshold 222 may be used to make estimates of the peak value of the signal. This may be used to generate a gain error and may also be used to drive the feedback loop.

Once the channel is locked to the data, the maximum-likelihood detector 218 may be used to recreate the written data. Once the written data is known, then the ideal expected signal may be determined. From this, the ideal signal may be compared to the received signal and a gain error may be generated. As an option, the switching between these modes may be accomplished utilizing a tracking and acquisition signal.

In the analog mode of operation, the gain error may be generated directly from the ADC 208 output. The first gain control circuit 206 will be less precise in this mode. In this mode of operation, any delay within the feedback loop of the system 200 would be small, which allows for a very high-gain mode of operation and a very quick response time for the system.

In the hybrid mode of operation, the analog mode of operation may be used during acquisition and the digital mode of operation may be used during tracking. This allows fast acquisition on the signal and a slower, more precise adjustment of the gain during the tracking.

The channel architecture of the system 200 is referred to as a digital asynchronous channel. A variation of this channel is called a digital synchronous channel. Fundamentally, this channel architecture differs from the digital asynchronous channel in the positioning of an interpolator 224 and the equalizer 220.

Figure 3A:
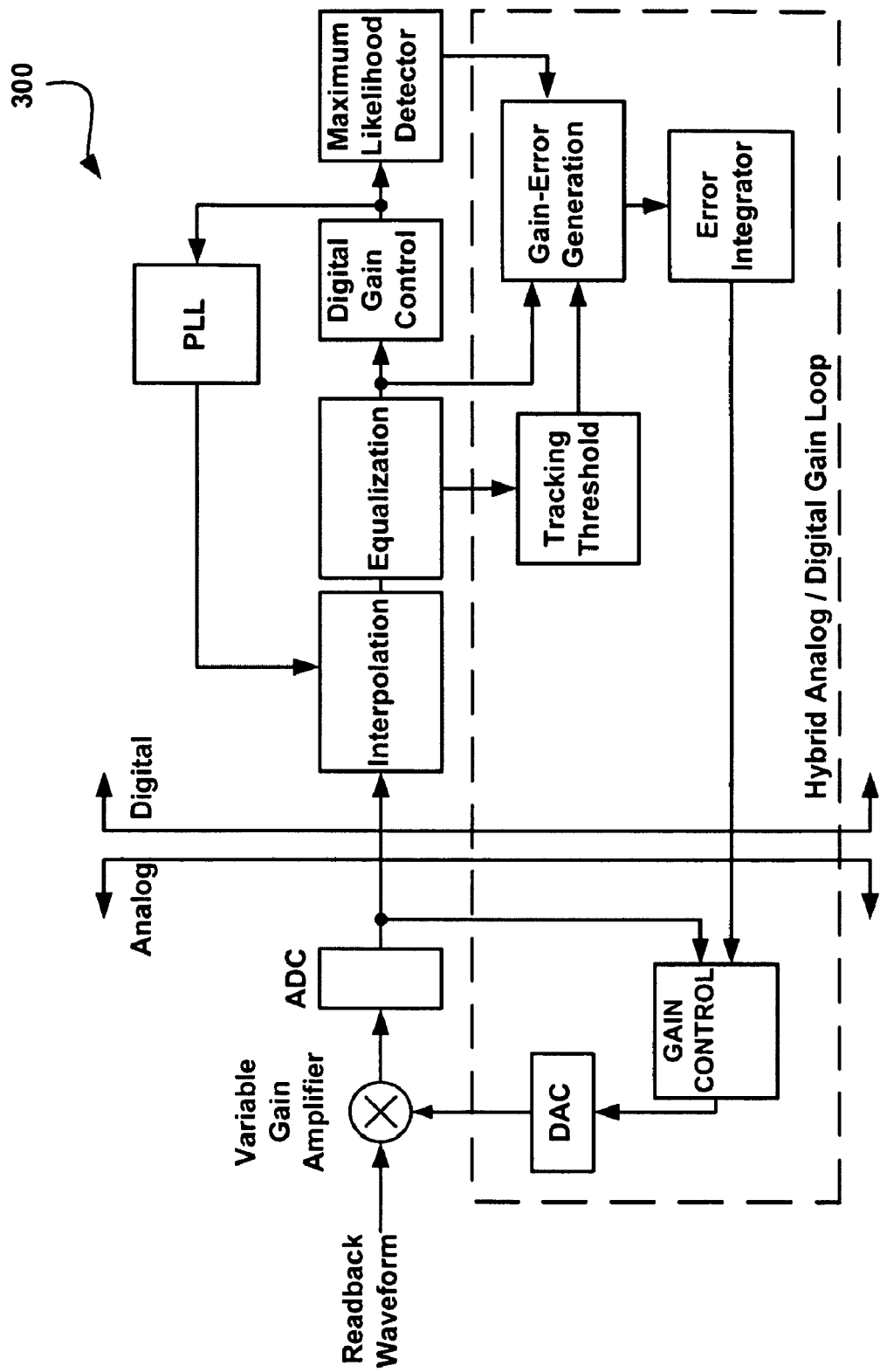
FIG. 3A shows a synchronous dual gain control system for gain control, in accordance with one embodiment.

In one embodiment, the dual gain control architecture described in the context of the-system 200 may be applied to the synchronous channel as well. FIG. 3A shows a synchronous dual gain control system 300 for gain control, in accordance with one embodiment. In this case, the system 300 may also be functional in various modes. As noted above, in the all digital mode of operation, during acquisition, the equalized waveform and the tracking threshold may be used to make estimates of the peak value of the signal and these estimates may be used to generate a gain error and may be used to drive the feedback loop.

Figure 3B:
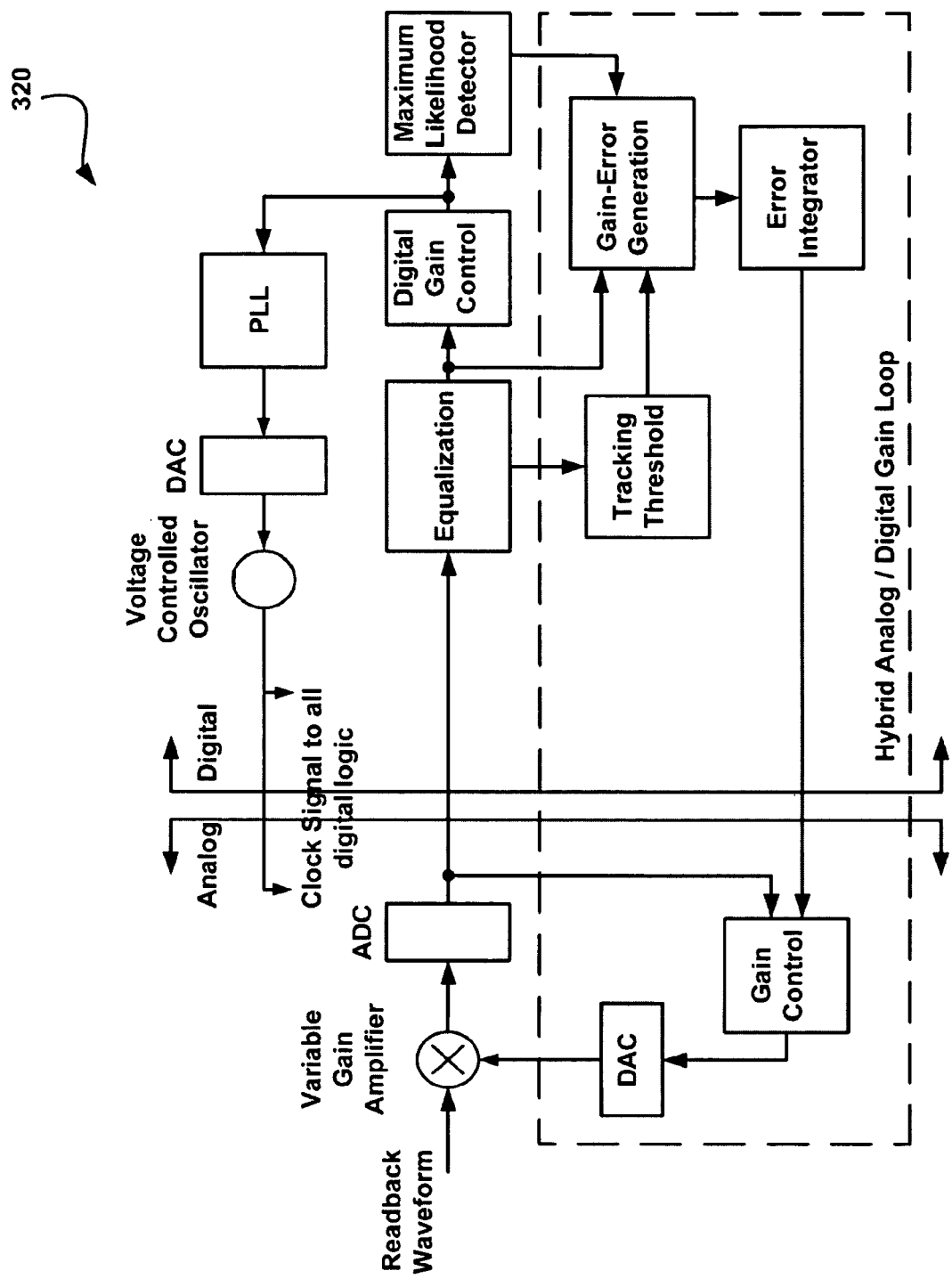
FIG. 3B shows a fully synchronous dual gain control system for gain control, in accordance with one embodiment.

Still yet, in one embodiment, a fully synchronous channel may be provided. In this case, the fully synchronous channel is similar to the system 300 with a synchronous channel architecture, except there is no interpolator. A phase locked-loop (PLL) drives sampling logic through a voltage controlled oscillator (VCO). FIG. 3B shows a fully synchronous dual gain control system 320 for gain control, in accordance with one embodiment.

FIG. 4A-4G show a method 400 for utilizing a hybrid analog/digital automatic gain control loop to generate an error signal, in accordance with one embodiment. As an option, the present method 400 may be implemented in the context of the functionality and architecture of FIGS. 1-3B. Of course, however, the method 400 may be carried out in any desired environment.

As shown, it is determined whether a system is in an acquisition or tracking mode. See operation 457. If it determined that the system is in an acquisition mode, it is further determined whether the system is in analog operation mode or hybrid operation mode. See operations 458-459.

If the system is not in the analog operation mode or the hybrid operation mode, it is determined whether there is a saturation error. See operation 460. If there is a saturation error, a first gain error mode is utilized, as depicted in FIG. 4B. See operation 452.

In the first gain error mode, a first gain error is generated, as shown in FIG. 4B. As shown, the generation of the first gain error signal includes receiving an output of an equalizer and comparing a magnitude of the output to a saturation threshold level. See operations 402-404. In one embodiment, the first gain error may be a fixed value.

If the output is higher than the saturation threshold level, the first gain error is then generated. See operation 406. The first gain error is used in combination with second gain error during acquisition in the digital mode of operation. The first gain is used when the amplitude of the signal at the output of the equalizer exceeds the saturation threshold. See operation 408. Otherwise, the second gain error is used.

If the output is lower than the saturation level used to determine the first gain error, then the second gain error is used. See operation 453 of FIG. 4A. In this case, the output from the equalizer may be an equalized waveform of a tape read-back signal. See operation 412 of FIG. 4C. Furthermore, a threshold qualified peak is generated from the equalizer output and a tracking threshold level. See operation 414.

Still yet, the threshold qualified peak is compared to a second threshold. See operation 416. As a result, the second gain error is generated based on the comparison. See operation 418. In this case, the second threshold may be any appropriate threshold. Additionally, the second threshold may be programmable.

Figure 4A:
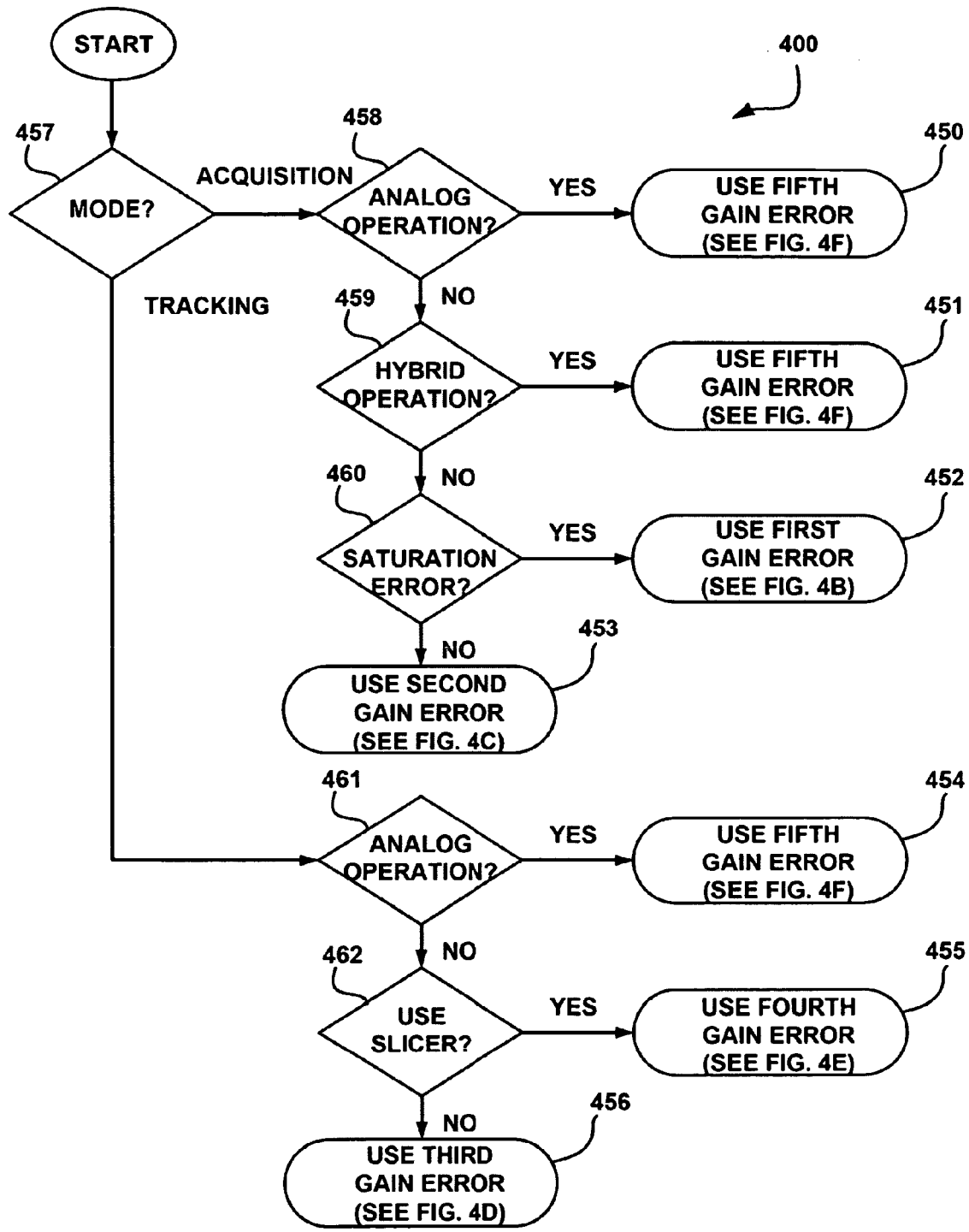
FIGS. 4A-4F show a method for utilizing a hybrid analog/digital automatic gain control loop to generate an error signal, in accordance with one embodiment.
Figure 4B:
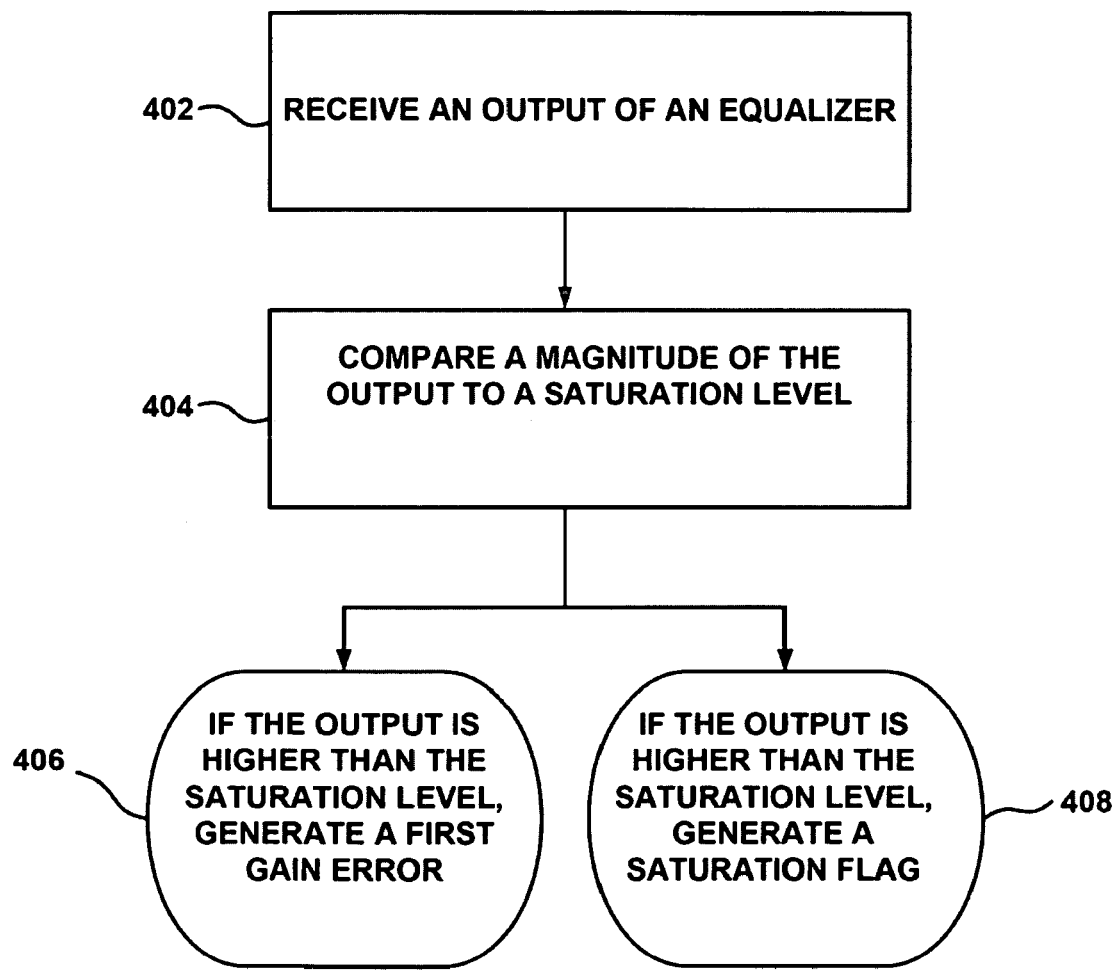
Figure 4C:
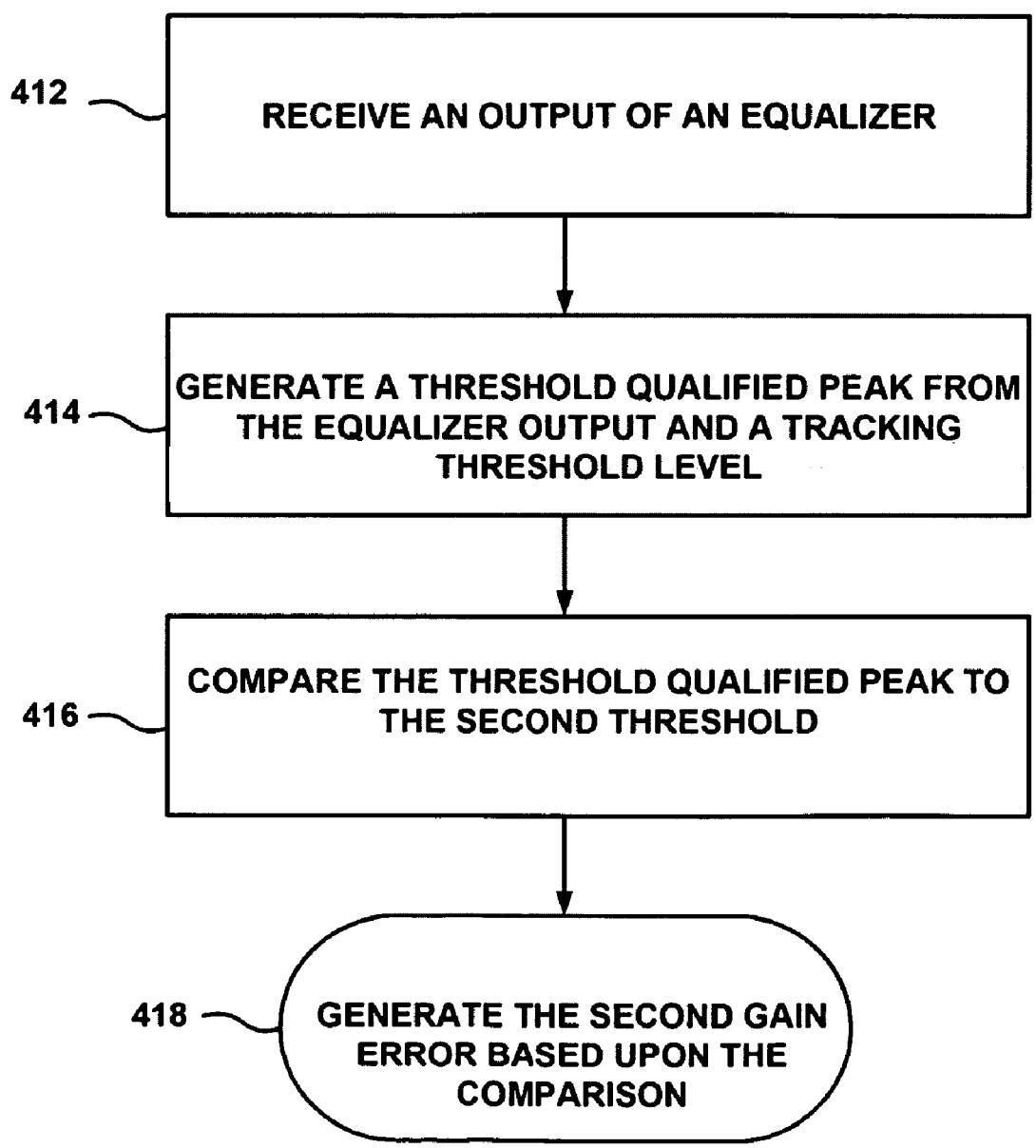

With further reference to FIG. 4A, if it is determined that the system is in a tracking mode and that the system is not in an analog mode of operation, it is determined whether a slicer is to be used. See operations 461-462. If it is determined not to use a slicer, a third gain error is generated. See operation 456.

Figure 4D:
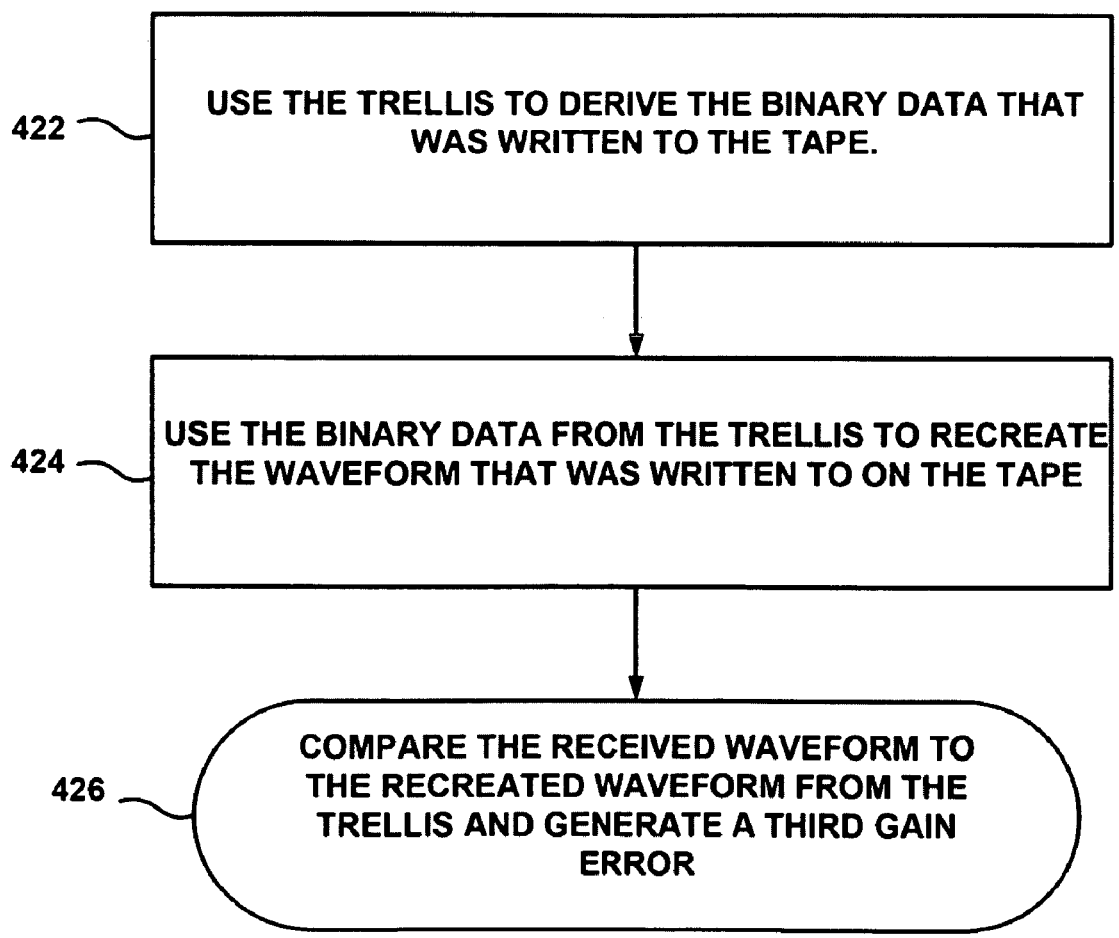

As shown in FIG. 4D, a third gain error is generated using the trellis of the maximum likelihood detector. See operation 422-426. In this case, the trellis is used recreate the binary sequence that was written to the tape. Once, the binary sequence is determined, the ideal, noise-free samples can be created. These ideal samples can be compared to the received samples and a third gain error can be generated. The third gain error is used when in the tracking mode for either the hybrid analog/digital mode of operation or the digital mode of operation.

Figure 4E:
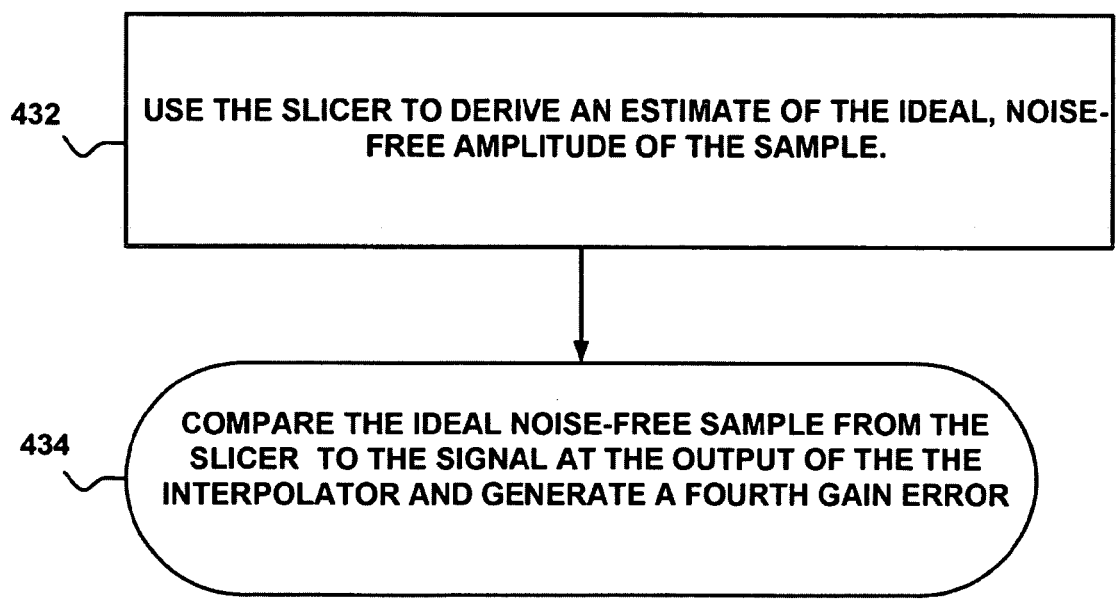

Referring back to FIG. 4A, if it is determined that a slicer is to be used, a forth gain error is generated. See operation 455. As shown in FIG. 4E, a fourth gain error is generated. In this case, the slicer is used to make estimates of the ideal samples from the samples received at the output of the interpolator. See operations 432-434. These ideal samples may be compared to the received samples to generate a fourth gain error. Similar to the method used to generate the third gain error, this method is used in the tracking mode for either the hybrid analog/digital mode of operation or the digital mode of operation. The selection of either the third gain error or the fourth gain error is programmable.

Figure 4F:
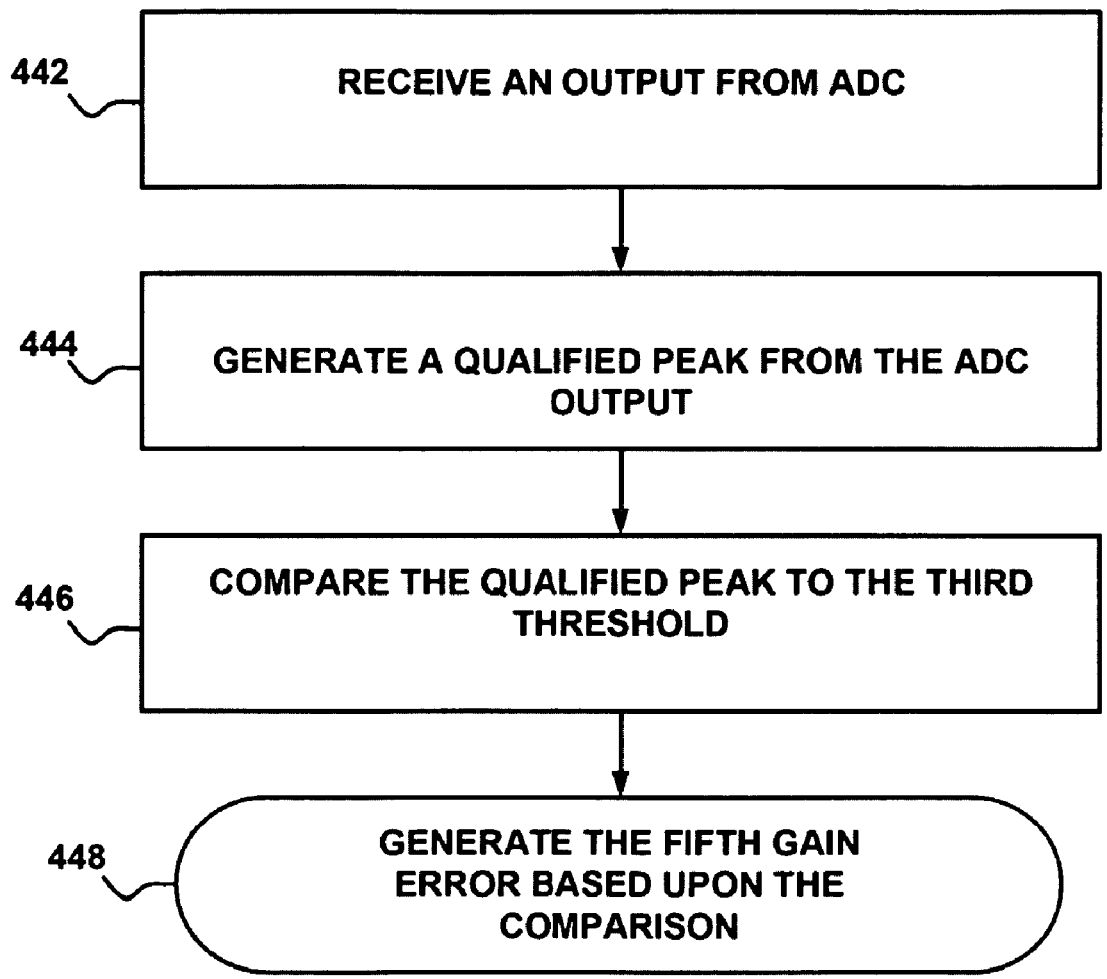

For all other cases illustrated in FIG. 4A, a fifth method of generating a gain error utilized. See operations 450, 451, and 454. As shown in FIG. 4F, the output of the equalizer is received and peaks are detected. See operations 442-444. The peaks are compared to a third threshold and a fifth gain error is determined. See operations 446-448. The logic for this circuitry is in the analog/digital front-end module. It is solely used with the analog mode of operation and used during acquisition with the hybrid analog/digital mode of operation.

Once the gain errors are generated, at least one of the five gain errors may be utilized to adjust a gain of an analog signal. For example, the first gain error may be used to adjust the gain of the analog signal if the output of the equalizer is higher than the saturation threshold level (e.g. see operation 452 of FIG. 4A). In addition, the second gain error may be used to adjust the gain of the analog signal if the output of the equalizer is lower than the saturation threshold level.

As an option, the method 400 may be implemented utilizing the analog/digital automatic gain control systems and functionality described above to generate an error signal. The error signal may then be used to drive a digital integrator that controls a variable gain amplifier. The variable gain amplifier may be used to control the gain of the signal being read from a tape.

In one embodiment, different components may be utilized to determine the gain error, based on different modes of operation of the system used for determining the gain error. For example, in one embodiment, a first mode may include saturation detection with maximum error generation mode (e.g. see operation 452 of FIG. 4A).

In another embodiment, a second mode may include comparing synchronous detection from either a slicer (e.g. see operation 455 of FIG. 4A) or a trellis (e.g. see operation 456 of FIG. 4A) to a data sample that has been synchronized and equalized. In yet another embodiment, in a third mode, an asynchronous threshold qualified peak detection may be compared with a target value (e.g. see operation 453 of FIG. 4A).

With respect to the second (digital) mode of operation and synchronous detection, the system performing the detection may be in a tracking mode such that the system is locked on to the data. In one embodiment, for synchronous operation, the source of the gain-error may be from either a slicer (e.g. see operation 455 of FIG. 4A) or a trellis implementation (e.g. see operation 456 of FIG. 4A). In this case, the slicer may be used to approximate an ideal signal by setting threshold levels and comparing the signal to these threshold levels (e.g. see FIG. 4E). By using the slicer, there may be less latency from the signal arrival to the generation of the gain error.

With respect to the trellis implementation, the trellis may use the maximum likelihood detector to recreate the ideal signal (e.g. see FIG. 4D). In this way, the trellis implementation may be utilized to generate an accurate estimate of the gain error.

As an option, a system may be configured such that the first saturation detection mode has priority over the other modes.

Figure 5:
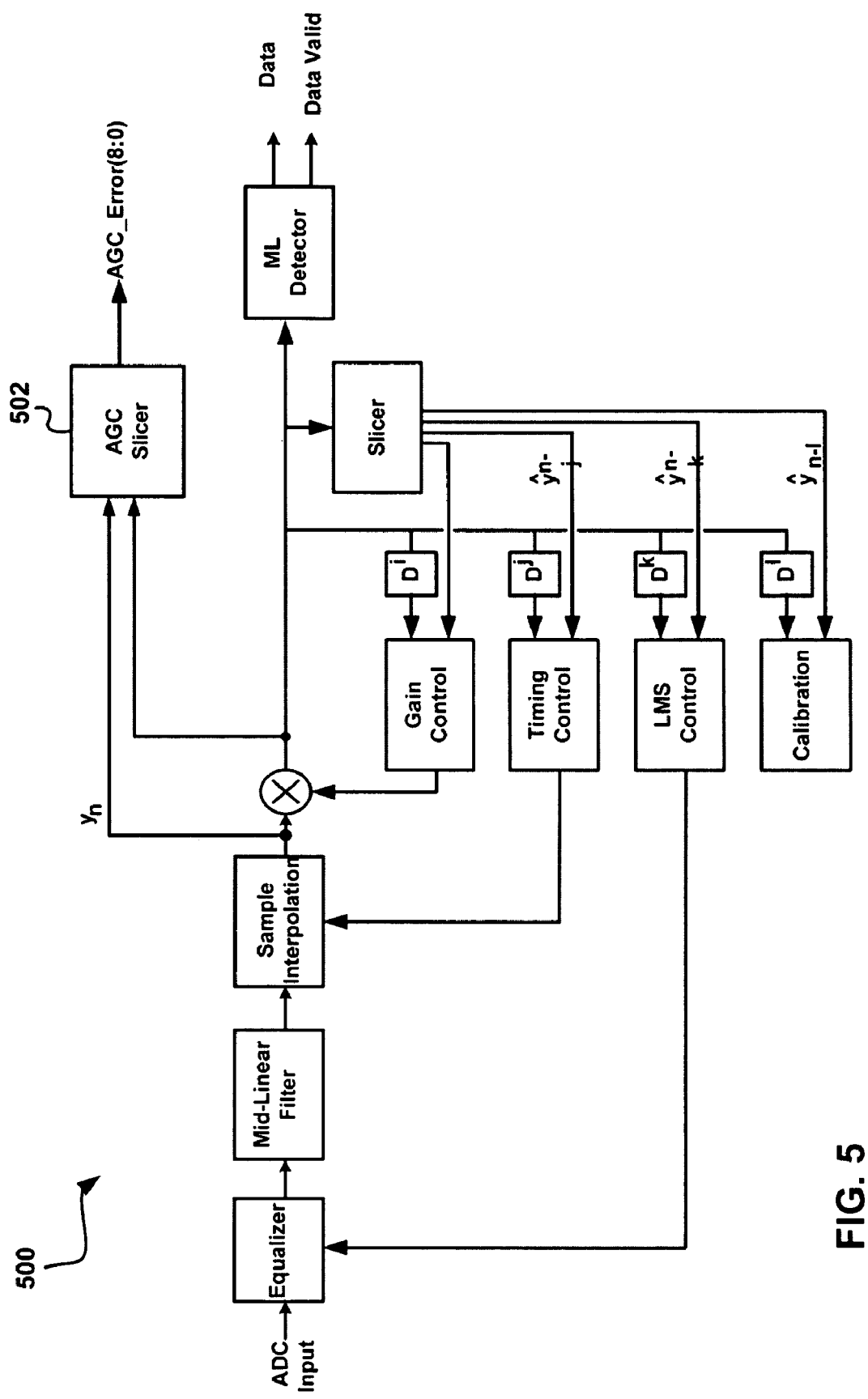
FIG. 5 shows a system including an AGC slicer, in accordance with one embodiment.

FIG. 5 shows a system 500 including an AGC slicer 502, in accordance with one embodiment. As an option, the system 500 may be implemented in the context of the functionality and architecture of FIGS. 1-4. Of course, however, the system 500 may be implemented in any desired environment. It should be noted that, all of the components depicted in the system 500 may be utilized with components from the trellis, described in further detail below. For example, the AGC slicer 502 may be used to control the gain, and timing control may be supplied from the trellis, etc.

In operation, the AGC slicer 502 may use gain-adjusted, synchronized samples to determine the received signal. For example, in a PR4 waveform, which may be utilized in accordance with one embodiment, the target levels are {+2, 0, −2} and the slice levels are set at {+1, −1}. Applying this criteria to the AGC slicer 502, if the gain-adjusted equalizer output is greater than 1, then the ideal signal is equal to 2 and the gain error is equal to 2 minus the ungain-adjusted equalizer output.

If the gain-adjusted equalizer output is less than −1, then the ideal signal is equal to −2 and the gain error is equal to the ungain-adjusted equalizer output minus 2. In any other case, the ideal signal is equal to 0, and the gain error is equal to 0. In this case, no error may be generated for a signal that is likely zero, as the gain estimate would be made using system noise.

With respect to a trellis implementation, the trellis implementation may be used to generate the estimates of the ideal signal. Because the trellis implementation involves utilizing a maximum likelihood detector to generate the estimates of the ideal signal, the estimates may be more reliable than other techniques not using a maximum likelihood detector.

Figure 6:
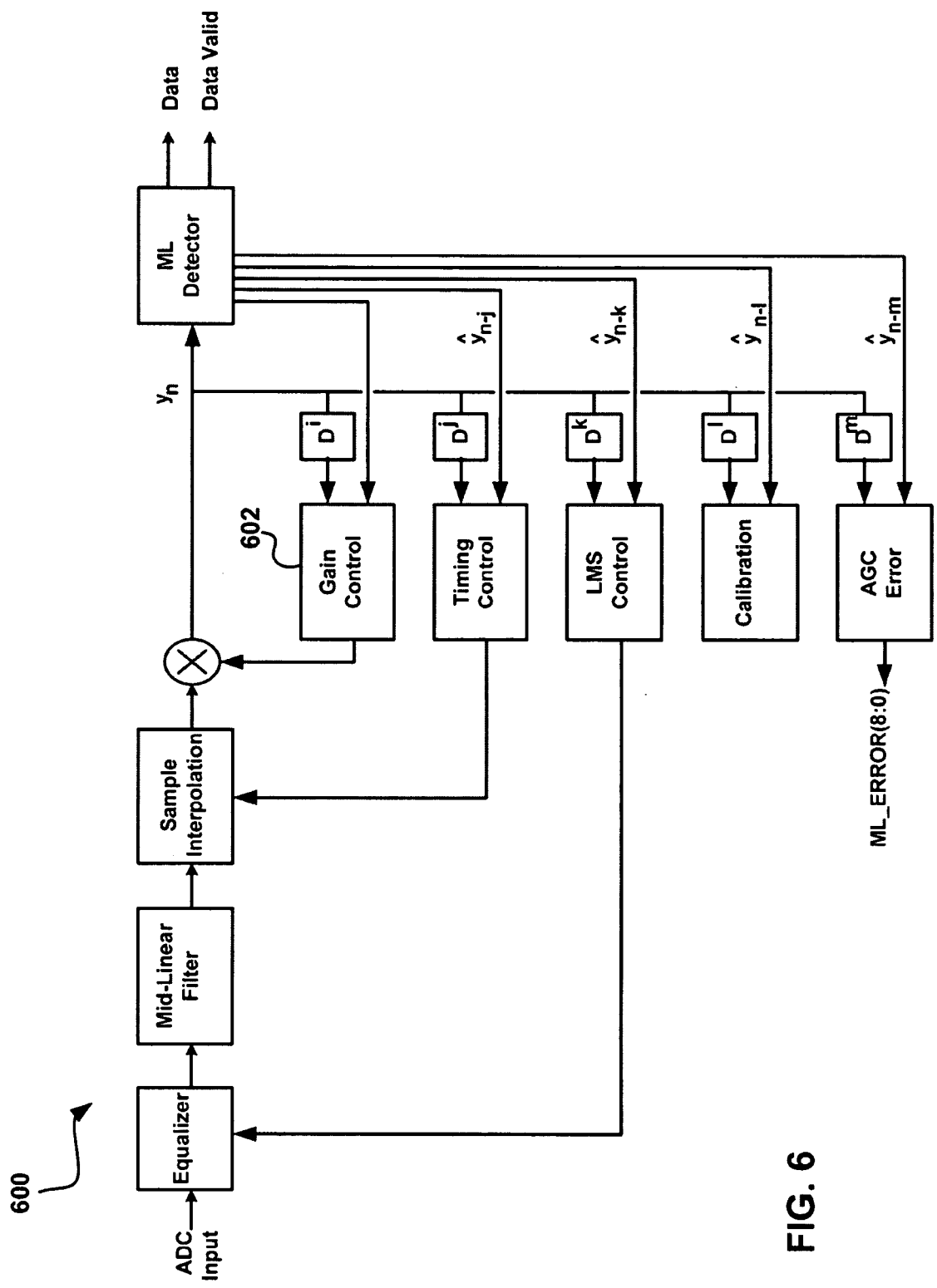
FIG. 6 shows a trellis system, in accordance with one embodiment.

FIG. 6 shows a trellis system 600, in accordance with one embodiment. As an option, the present system 600 may be implemented in the context of the functionality and architecture of FIGS. 1-5. Of course, however, the system 600 may be implemented in any desired environment.

In operation, and in the context of a PR4 signal, which may be utilized in accordance with one embodiment, the PR4 signal is converted to an EPR4 signal. Thus, there may be five possible levels in the ideal signal, {−2, −1, 0, +1, +2}. An equalizer output is delayed to match a timing of the ideal signals from the trellis system 600, before any gain adjustment by a high-speed digital AGC 602.

In this case, if the ideal signal is equal to 2, then the gain error is equal to 2*(2-ungain-adjusted equalizer output). If the ideal signal is equal to 1, then the gain error is equal to 1 minus the ungain-adjusted equalizer output. If the ideal signal is equal to −1, then the gain error is equal to the ungain-adjusted equalizer output minus 1.

If the ideal signal is equal to −2, then the gain error is equal to 2*(ungain-adjusted equalizer output −2). In any other case, the ideal signal is equal to zero 0, and the gain error is equal to 0. In this case, no error may be generated for a signal that is likely zero, as the gain estimate would be made using system noise.

With respect to the third mode, an asynchronous gain error may be generated when a channel is not locked on to the data. This may occur, for example, in the variable-frequency oscillator (VFO) or data set separator (DSS) fields. For the asynchronous gain error, a tracking threshold and an equalizer output may be used to generate a threshold qualified peak. This peak may be compared to a programmable threshold and a gain error may be generated. In one embodiment, a first stage of the asynchronous gain-error generation may include a derivative block and threshold qualification. This mode corresponds to a digital mode of operation in an acquisition mode (e.g. see operation 453 of FIG. 4A). There is similar logic in the analog/digital front-end module that is used if the system is in an analog mode of operation (e.g. see operations 450 and 451 of FIG. 4A).

Figure 7:
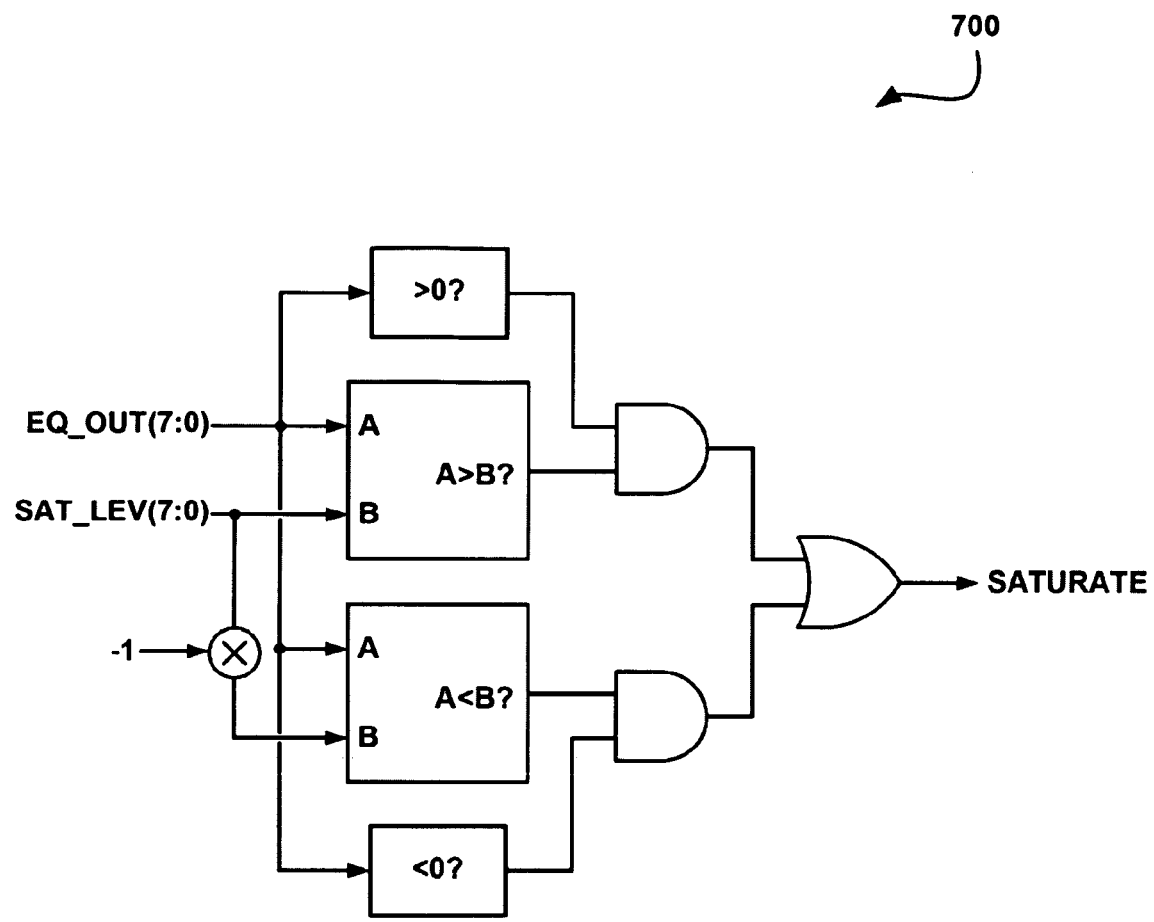
FIG. 7 shows a system including logic for generating a gain error based on a saturation threshold level, in accordance with one embodiment.

FIG. 7 shows a system 700 including logic for generating a gain error based on a saturation threshold level, in accordance with one embodiment. As an option, the present system 700 may be implemented in the context of the functionality and architecture of FIGS. 1-6. Of course, however, the system 700 may be implemented in any desired environment. In one embodiment, the system 700 may be utilized to implement the functionality described in the context of operation 402, 404, and 408 of FIG. 4B.

Utilizing the system 700, a threshold SAT_LEV may be set to specify a saturation level. If the magnitude of the signal at an equalizer output EQ_OUT is greater than this threshold, then it may be assumed that the equalized signal is saturated and the gain should be reduced. In one embodiment, for this situation, a maximum gain error may be generated (e.g. 64, etc.).

In operation, an output of an equalizer may be received [e.g. EQ_OUT(7:0)]. In this case, the output from the equalizer may be an equalized waveform of a tape read-back signal. A magnitude of the output is compared to a saturation threshold level [SAT_LEV(7:0)]. If the output is higher than the saturation threshold level, a gain error may then be generated.

Additionally, the gain error may include a fixed gain error that may be used to adjust a gain of an analog signal.

Figure 8:
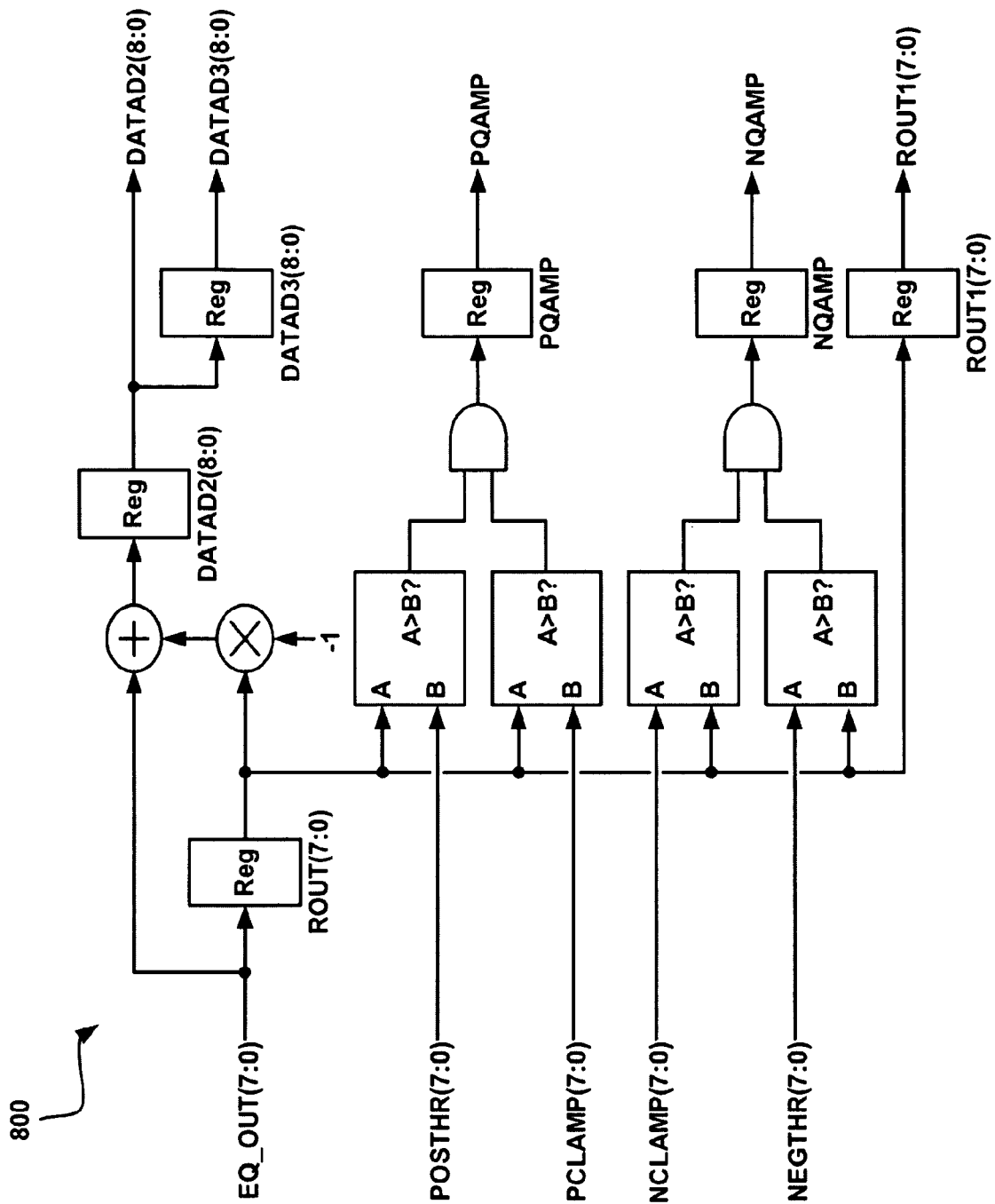
FIG. 8 shows a first stage of an asynchronous system, in accordance with one embodiment.

FIG. 8 shows a first stage of an asynchronous system 800, in accordance with one embodiment. As an option, the present system 800 may be implemented in the context of the functionality and architecture of FIGS. 1-7. Of course, however, the system 800 may be implemented in any desired environment.

In operation, an output of an equalizer [e.g. EQ_OUT(7:0)] is received. A threshold qualified peak is then generated from the equalizer output and a tracking threshold level. The threshold qualified peak is then compared to a second threshold. Further, a gain error is generated based on the comparison.

In this case, the signals DATAD2 and DATAD3 are two different phases of the equalizer derivative. PQAMP is set if the equalizer signal is greater that the positive tracking threshold and NQAMP is set if the equalizer signal is less than the negative tracking threshold.

In this way, multiple threshold qualified peaks may be generated for two phases of the equalizer output. The threshold qualified peaks may be compared to positive and negative thresholds, where a positive signal (e.g. PQAMP) is generated if the equalizer output is higher than a positive tracking threshold. Additionally, a negative signal (e.g. NQAMP) is generated if the equalizer output is lower than a negative tracking threshold. In one embodiment, a second stage of the asynchronous gain error generation may determine if a peak occurs by examining a derivative of a signal.

Figure 9:
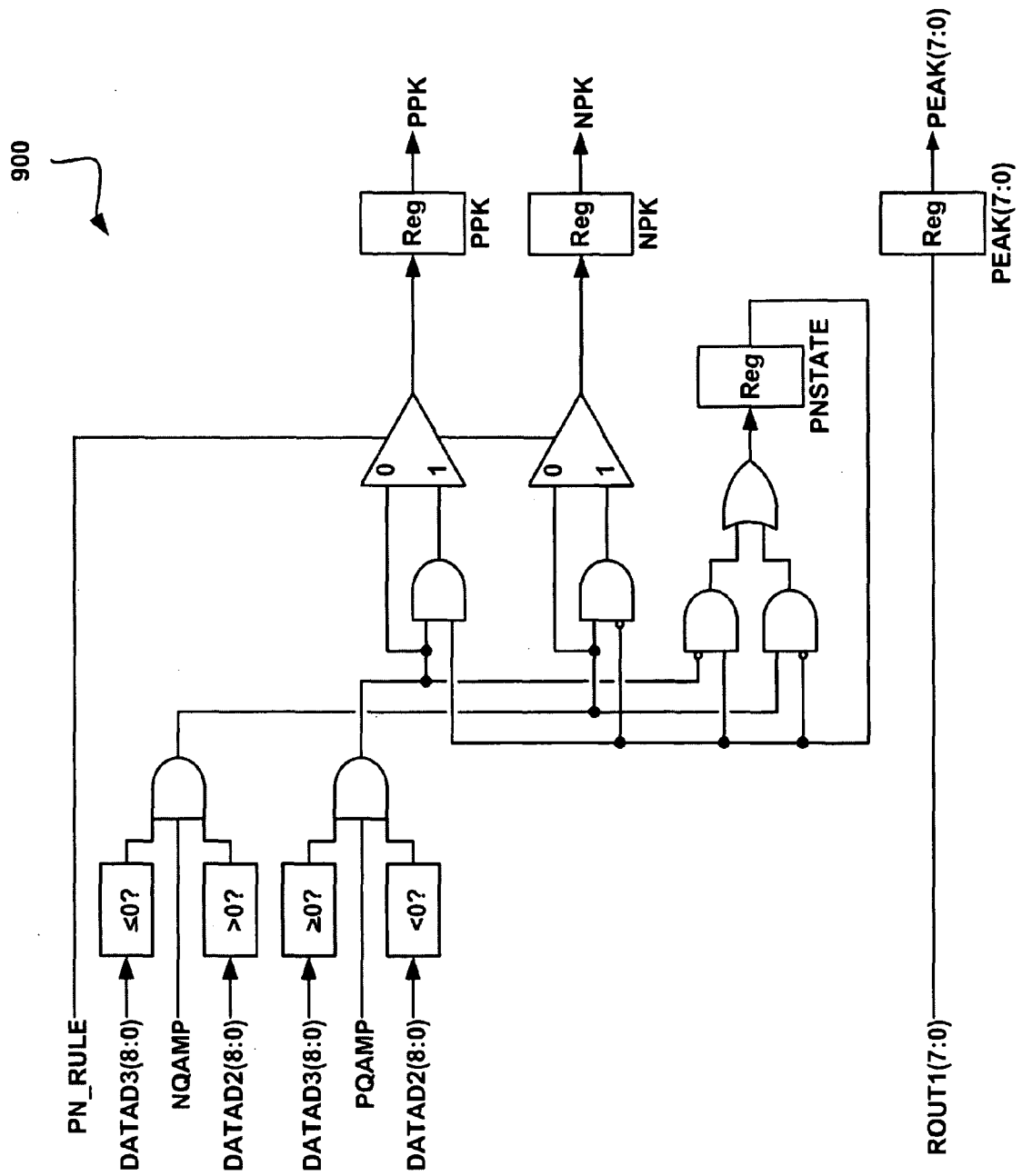
FIG. 9 shows a second stage of an asynchronous system, in accordance with one embodiment.

FIG. 9 shows a second stage of an asynchronous system 900, in accordance with one embodiment. As an option, the present system 900 may be implemented in the context of the functionality and architecture of FIGS. 1-8. Of course, however, the system 900 may be implemented in any desired environment.

If there is a zero-crossing in the derivative of the signal with a positive slope and NQAMP (illustrated in FIG. 8) is set, then a negative qualified peak may be determined to have occurred and NPK (illustrated in FIG. 9) may be set. Similarly, if there is a zero-crossing in the derivative of the signal with a negative slope and PQAMP (illustrated in FIG. 8) is set, then a positive qualified peak may be determined to have occurred and PPK (illustrated in FIG. 9) may be set.

It should be noted that various functionality, logic, and components of the systems and functionality described above may be combined in various embodiments. For example, in one embodiment, logic may be configured for receiving an output of an equalizer, comparing a magnitude of the output to a saturation threshold level, and for generating a first gain error if the output is higher than the saturation threshold level. Furthermore, either a slicer or a trellis may be utilized for generating a second gain error, where the slicer generates a gain error based on an output of an interpolator and the trellis generates a gain error based on an output of a maximum likelihood detector. In this case, the first gain error may be used to adjust the gain of the analog signal if the output of the equalizer is higher than the saturation threshold level, and the second gain error may be used to adjust the gain of the analog signal if the output of the equalizer is lower than the saturation threshold level (e.g. see FIG. 4A).

As another option, the first gain error may be used to adjust the gain of the analog signal if the output of the equalizer is higher than the saturation threshold level, and the third gain error may be used to adjust the gain of the analog signal if the output of the equalizer is lower than the saturation threshold level. As still another option, either the second or the third gain error may be used to adjust the gain of the analog signal if the output of the equalizer is lower than the saturation threshold level (e.g. see FIG. 4A).

Figure 10:
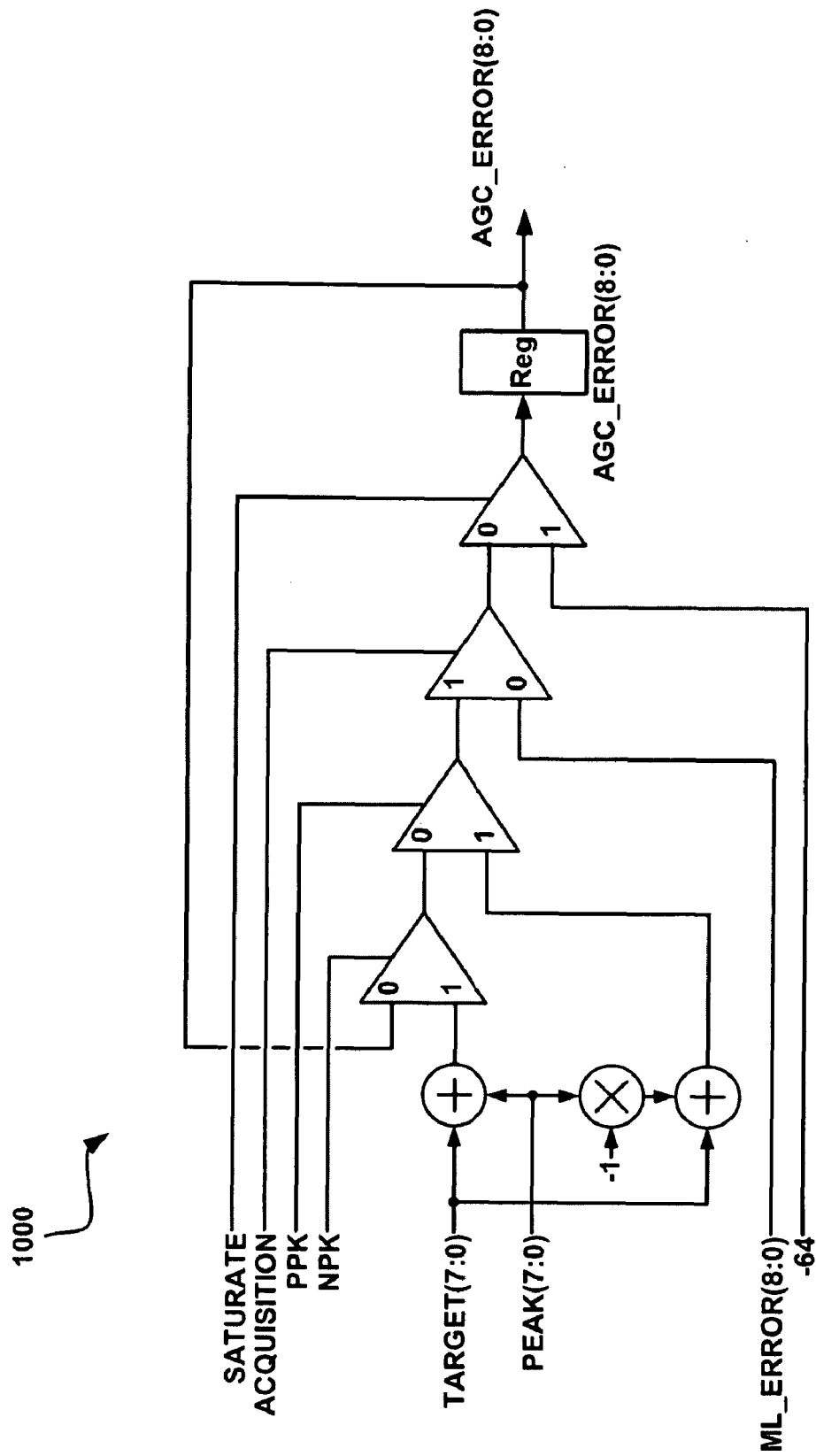
FIG. 10 shows a system for selecting different modes of gain error generation, in accordance with one embodiment.

FIG. 10 shows a system 1000 for selecting different modes of gain error generation, in accordance with one embodiment. As an option, the present system 1000 may be implemented in the context of the functionality and architecture of FIGS. 1-9. Of course, however, the system 1000 may be implemented in any desired environment.

As shown, the system 1000 is configured such that a saturation mode takes priority. If a saturate bit is set, a fixed gain error may be generated. If a system (i.e. a channel) is in a tracking mode, then the gain error may be generated by synchronous channel logic, and such logic may be selected. Furthermore, if the channel is in an acquisition mode, then the gain error may be generated according to the acquisition mode logic.

As noted above, the source of control in gain control systems may be switched from an analog module to a logic module depending upon on mode of operation, such as an acquisition or tracking mode. In an acquisition mode, an AGC may quickly lock on to a signal and adjust the amplitude of the signal to the approximate target levels. The gain control system may implement a feedback loop with short latency and high gains, located in the analog module.

During the tracking mode, precise estimates of the signal amplitude are often required. As a result, the gain control loop may be configured to be quickly and efficiently switched from one module to the other based upon the mode of operation. Additionally, because a variable gain amplifier and some of the digital control logic in gain control system may be partitioned onto separate module, data should be efficiently transferred from one module to the other.

Figure 11A:
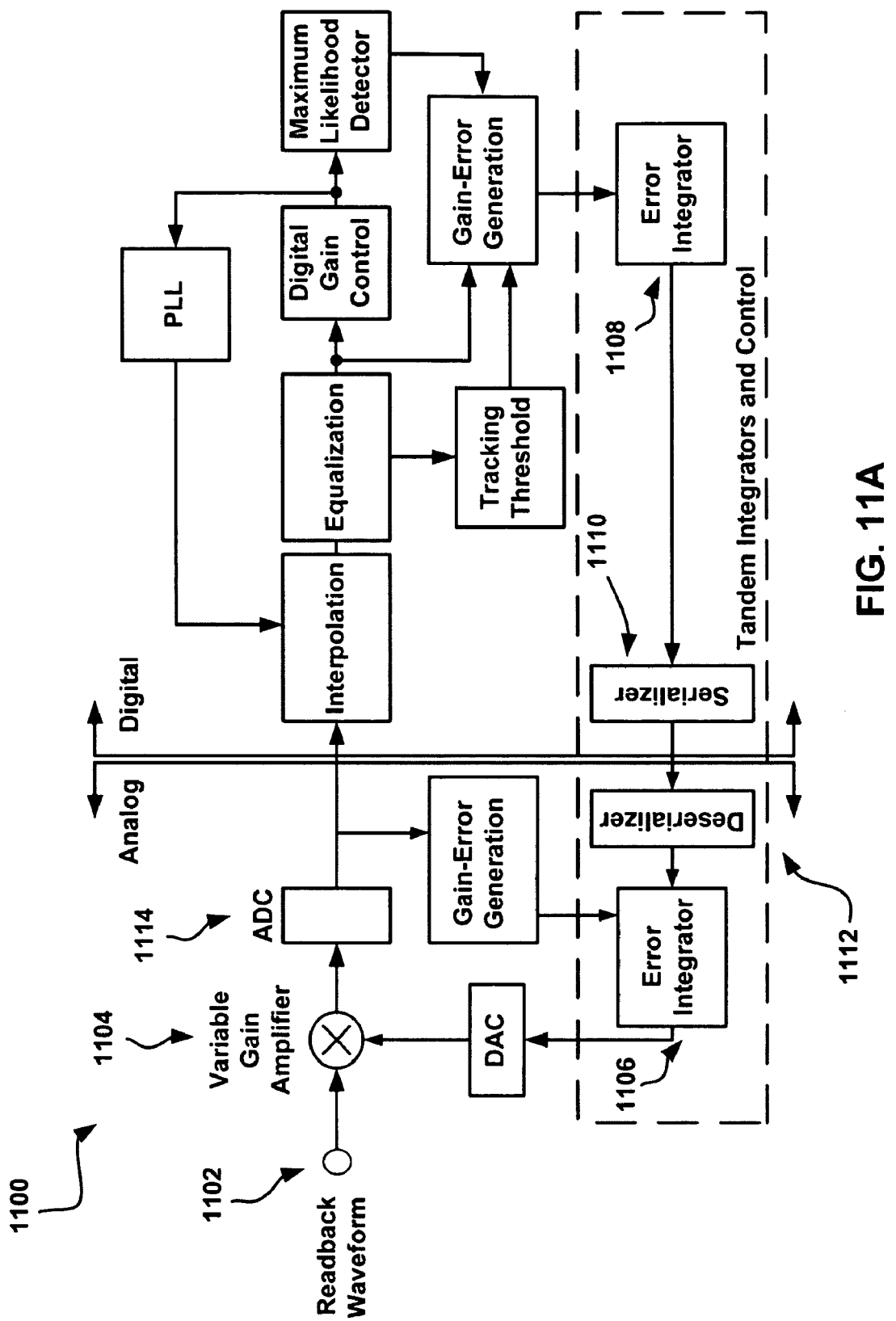
FIG. 11A shows a dual gain control system for gain control, in accordance with another embodiment.

FIG. 11A shows a dual gain control system 1100 for gain control, in accordance with another embodiment. As an option, the present system 1100 may be implemented in the context of the details of FIGS. 1-10. Of course, however, the system 1100 may be implemented in any desired environment.

As shown, the system 1100 includes an analog input 1102 for receiving an analog signal, and a variable gain amplifier 1104 coupled to the analog input 1102. Furthermore, the system 1100 includes a first integrator 1106 coupled to the variable gain amplifier 1104 for controlling the gain of the analog signal. Additionally, the system 1100 includes a second integrator 1108 for generating control signals for controlling functions of the first integrator 1106. In one embodiment, the second integrator 1108 may include inputs for attack and decay gains and a mechanism for selecting one of the gains. In this case, a multiplier may also be provided for multiplying the selected gain by a gain error value.

Figure 11B:
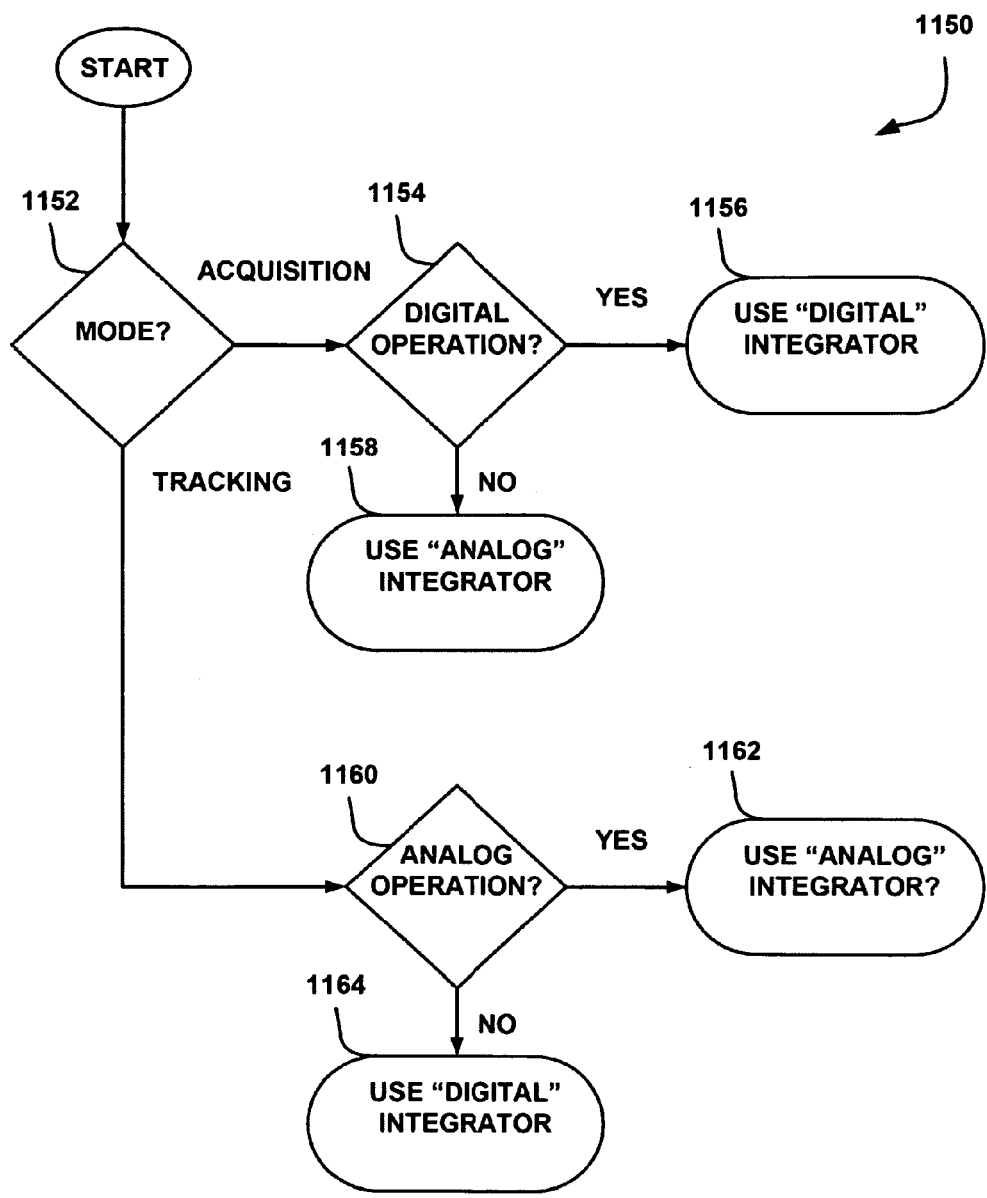
FIG. 11B shows a method for selecting one integrator or another, in accordance with one embodiment.

FIG. 11B shows a method 1150 for selecting one integrator or another, in accordance with one embodiment. As shown, it is determined whether the system is in an acquisition or tracking mode. See operation 1152.

If the system is in an acquisition mode, it is determined whether the system is in a digital operation mode. See operation 1154. If the system is in a digital operation mode, a digital integrator is used. See operation 1156. If the system is not in the digital operation mode, an analog integrator is used. See operation 1158.

If the system is in a tracking mode mode, it is determined whether the system is in an analog operation mode. See operation 1160. If the system is not in an analog operation mode, a digital integrator is used. See operation 1164. If the system is in the analog operation mode, an analog integrator is used. See operation 1162.

With further reference to FIG. 11A, the system 1100 also includes a serializer 1110 for serializing the control signals and a deserializer 1112 coupled to the serializer 1110 for deserializing the control signals and passing the deserialized control signals to the first integrator 1106.

In operation, the serializer 1110 may output an increment signal for instructing the first integrator 1106 to increment the gain of the analog signal and a decrement signal for instructing the first integrator 1106 to decrement the gain of the analog signal. Additionally, an analog to digital converter 1114 may be provided for converting the analog signal to a digital signal. In this case, the serializer 1110 may output a signal for an analog gain control mode in which the first integrator 1106 uses a gain error signal derived from an output of the analog to digital converter 1114 (e.g. the fifth gain error illustrated in FIG. 4F). As shown in FIG. 11A, the system 1100 may be viewed as an analog module and a digital logic module. It should again be noted that the "analog" module may include both analog circuitry and digital circuitry.

Figure 12:
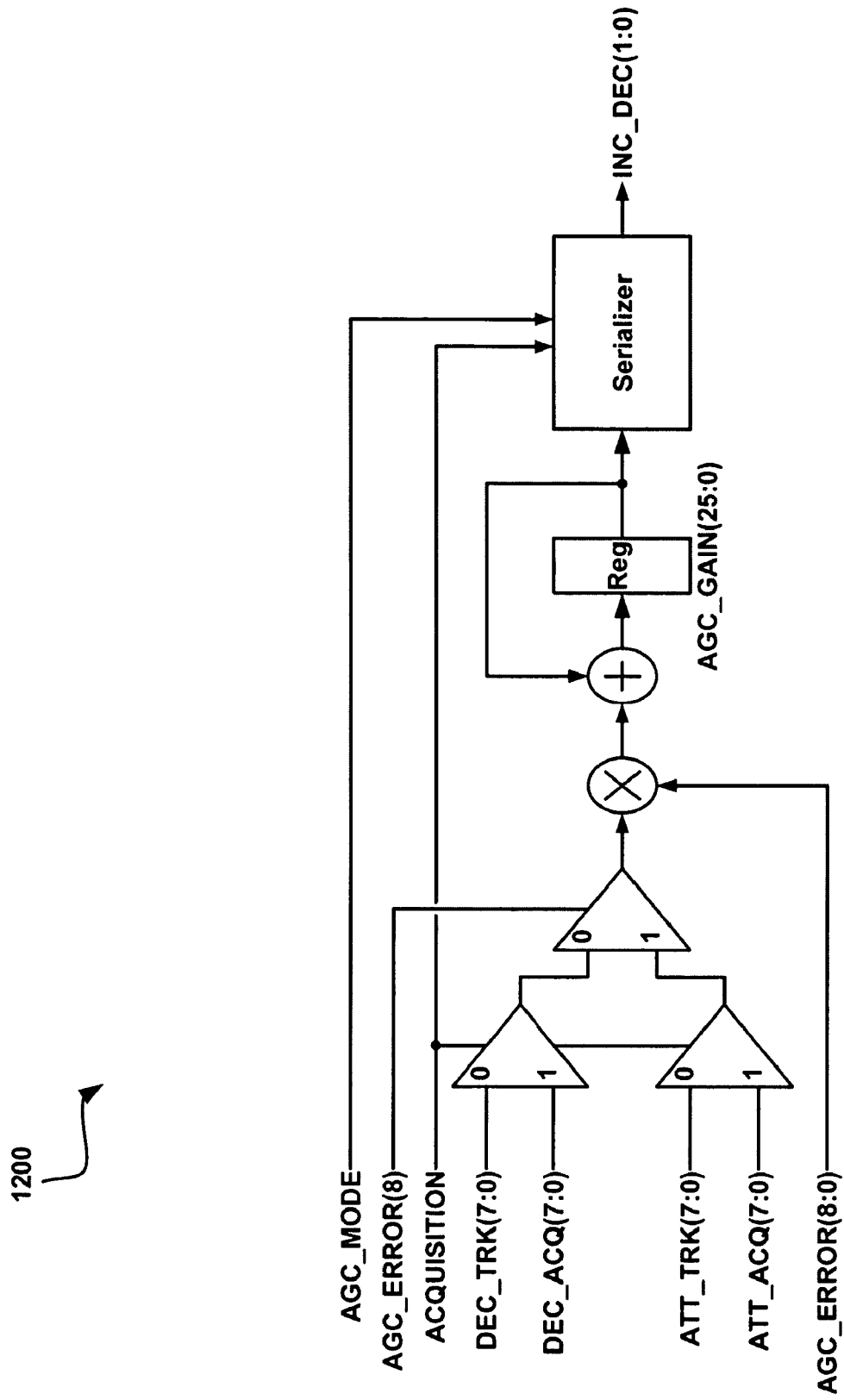
FIG. 12 shows a gain error integrator and serializer of a digital logic module, in accordance with one embodiment.

FIG. 12 shows a system 1200 comprising logic of a digital logic module, in accordance with one embodiment. As an option, the present system 1200 may be implemented in the context of the details of FIGS. 1-11. Of course, however, the system 1200 may be implemented in any desired environment.

In operation, there are attack and decay gains for acquisition and attack and decay gains for tracking (e.g. ATT_TRK, ATT_ACQ, DEC_TRK, DEC_ACQ). Depending upon the state of gain error AGC_ERROR and the mode of the channel, an appropriate gain is selected. This gain is then multiplied by the gain error AGC_ERROR and added to the value in the gain register AGC_GAIN (e.g. the integrating register described in 1108). The AGC_GAIN register is connected to a serializer that transmits two bits from each data channel. If the gain register overflows, then a 01 is transmitted. If the gain register underflows, then a 10 is transmitted. In any other case, a 00 is transmitted. In order to switch to an only analog mode of operation (e.g. during acquisition), a 11 is transmitted. On the receive side, in the analog module, the increment/decrement signal may be input into a deserializer.

Figure 13:
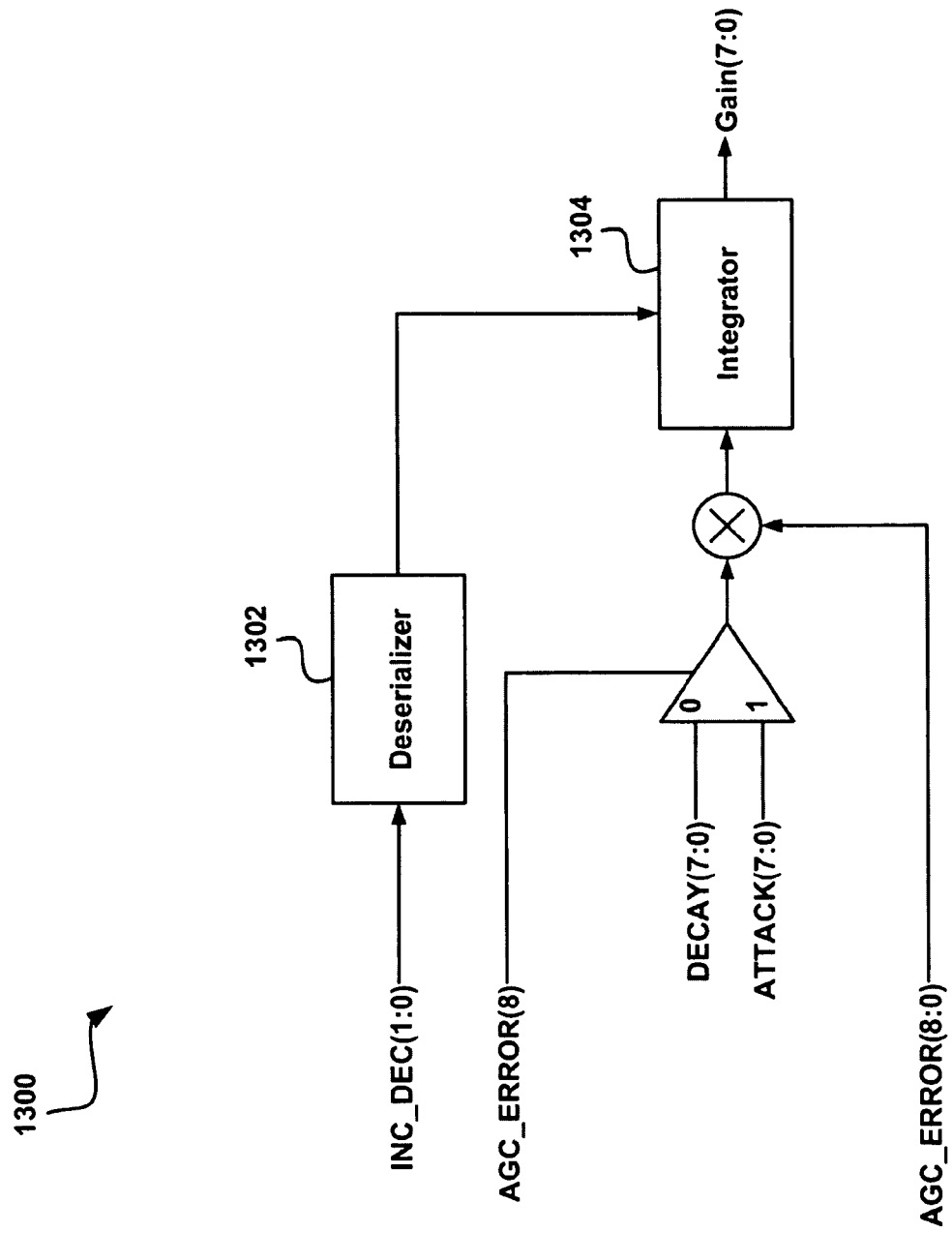
FIG. 13 shows a gain error integrator and deserializer of an analog module, in accordance with one embodiment.

FIG. 13 shows a system 1300 comprising the digital logic contained in the analog/digital front-end module, in accordance with one embodiment. As an option, the present system 1300 may be implemented in the context of the details of FIGS. 1-12. Of course, however, the system 1300 may be implemented in any desired environment.

As shown, the increment/decrement signal may be input into a deserializer 1302. The deserializer 1302 may then reconstruct the increment/decrement signal and control the operation of an integrator 1304 in the analog/digital front-end module. The architecture of the integrator 1304 is very similar to an integrator of the digital back-end module (e.g. of FIG. 12), however, in this case, the integrator 1304 is controlled by deserializing logic of the deserializer 1302.

Figure 14:
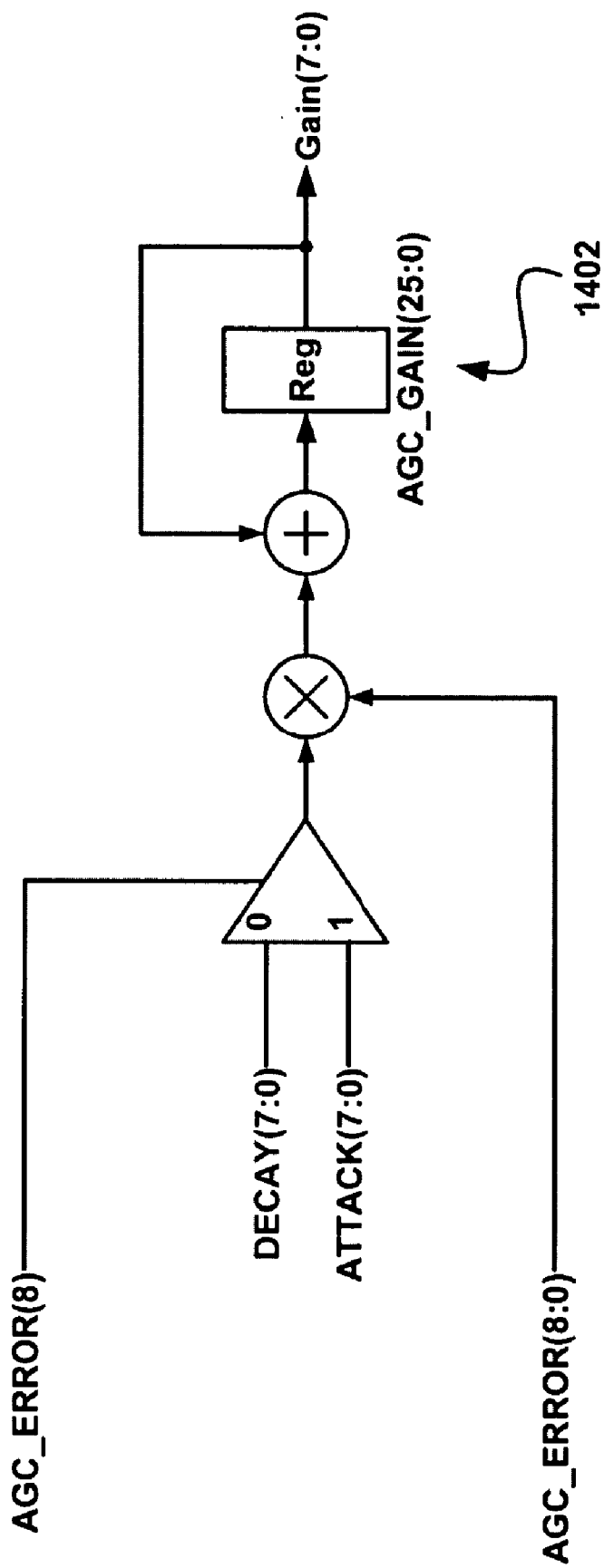
FIG. 14 shows a system configuration of an integrator running within an analog module, in accordance with one embodiment.

In one embodiment, there may be two fundamental modes for the integrator 1304. For example, if a 11 is decoded by the deserializer 1302, then the integrator 1304 may be run solely within the analog/digital front-end module, as depicted in FIG. 14. The AGC_ERROR (e.g. FIG. 4F) signal may be received directly from logic within the analog/digital front-end module.

Depending upon the polarity of the AGC_ERROR signal, the attack gain or the decay gains may be multiplied by the AGC_ERROR signal. This is then added to the contents of an integrating register 1402. In one embodiment, the eight most significant bits of the integrating register 1402 may be used to directly drive a digital-to-analog converter that controls the variable gain amplifier.

Figure 15:
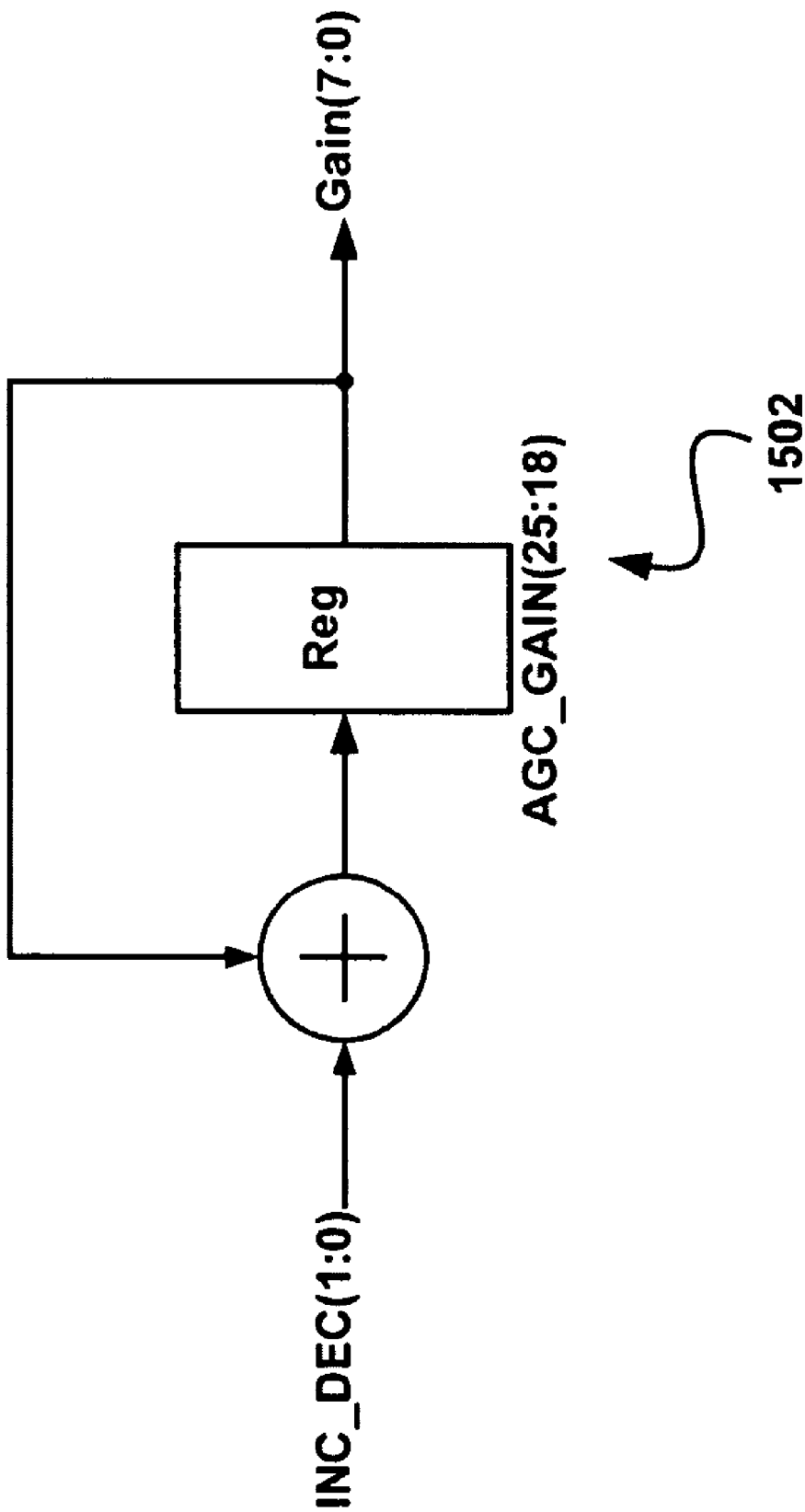
FIG. 15 shows a system configuration of an integrator running within an analog module, in accordance with one embodiment.

If the digital back-end module is controlling the loop, then increment/decrement signals may be received utilizing the deserializing interface, as depicted in FIG. 15. In this case, only the 8 most significant bits of an integrator in the analog/digital front-end module may be incremented or decremented. Furthermore, the eight most significant bits of an integrating register 1502 are used to directly drive the digital-to-analog converter that controls the variable gain amplifier.

Using these systems and logic, an analog signal may be received and converted to a digital signal. Additionally, the digital signal may be processed and the processed digital signal may be analyzed for generating a gain error signal. Furthermore, a control signal may be generated based on the gain error signal, where the control signal is serialized and subsequently deserialized and the control signal is used to adjust a gain of the analog signal.

Still yet, the adjustment of the gain of the analog signal may be based on the processed digital signal. In this case, one control signal may cause the gain of the analog signal to increment and one control signal may cause the gain of the analog signal to decrement. In addition, one control signal may cause an error integrator controlling the gain of the analog signal to use a gain error signal derived from an output of an analog to digital converter into which the analog signal is fed (e.g. FIG. 4F).

As noted above, an analog module (actually the analog/digital front-end module) and an all digital back-end logic module may be provided, either as separated modules or as one module with separate functionality. For example, an increment signal may be received at a first integrator on an analog/digital front-end module when a second integrator on a logic (i.e. digital) module overflows. A decrement signal may then be received at the first integrator when the second integrator underflows and a gain of an analog signal may be incremented or decremented based on receipt of the increment or decrement signal.

Moreover, different modes may be utilized to implement different functionality. For example, during an acquisition mode, the increment and decrement signals may be ignored. Additionally, during an acquisition mode, the first integrator may receive a gain error signal derived from an output of an analog to digital converter into which the analog signal is fed. In this case, the second integrator may receive a gain error signal derived from a processed output of the analog to digital converter. Still yet, the increment and decrement signals may be generated by a serializer coupled to the second integrator, and the increment and decrement signals may be deserialized by a deserializer prior to receipt by the first integrator.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
  generating a first gain error, comprising:
    receiving an output of an equalizer; and
    comparing a magnitude of the output to a saturation threshold level;
    if the output is higher than the saturation threshold level, generating a first gain error;

generating at least one of a second and a third gain error, wherein generating the second gain error comprises:
using either a slicer or a trellis for generating the second gain error,
wherein the slicer generates a gain error based on an output of an interpolator,
wherein the trellis generates a gain error based on an output of a maximum likelihood detector;
wherein generating the third gain error comprises:
receiving an output of an equalizer;
generating a threshold qualified peak from the equalizer output and a tracking threshold level;
comparing the threshold qualified peak to a second threshold; and
generating a third gain error based on the comparison.

2. A method as recited in claim 1, wherein the first gain error is a fixed value.

3. A method as recited in claim 1, wherein the second threshold is programmable.

4. A method as recited in claim 1, wherein the output from the equalizer is an equalized waveform of a tape readback signal.

5. A method as recited in claim 1, further comprising using at least one of the gain errors to adjust a gain of an analog signal.

6. A method as recited in claim 5, wherein the first gain error is used to adjust the gain of the analog signal if the output of the equalizer is higher than the saturation threshold level, wherein the second or third gain error is used to adjust the gain of the analog signal if the output of the equalizer is lower than the saturation threshold level.

7. A method as recited in claim 1, wherein multiple threshold qualified peaks are generated for two phases of the equalizer output, wherein the threshold qualified peaks are compared to positive and negative thresholds, wherein a positive signal is generated if the equalizer output is higher than a positive tracking threshold, wherein a negative signal is generated if the equalizer output is lower than a negative tracking threshold.

8. A method, comprising:
receiving an output of an equalizer; and
comparing a magnitude of the output to a saturation threshold level;
if the output is higher than the saturation threshold level, generating a gain error, wherein the gain error is a fixed value.

9. A method as recited in claim 8, further comprising using the gain error to adjust a gain of an analog signal.

10. A method as recited in claim 8, wherein the output from the equalizer is an equalized waveform of a tape readback signal.

11. A method, comprising:
receiving an output of an equalizer;
generating a threshold qualified peak from the equalizer output and a tracking threshold level;
comparing the threshold qualified peak to a second threshold;
generating a gain error based on the comparison; and
using the gain error to adjust a gain of an analog signal.

12. A method as recited in claim 11, wherein the output from the equalizer is an equalized waveform of a tape readback signal.

13. A method as recited in claim 11, wherein the second threshold is programmable.

14. A method as recited in claim 11, wherein multiple threshold qualified peaks are generated for two phases of the equalizer output, wherein the threshold qualified peaks are compared to positive and negative thresholds, wherein a positive signal is generated if the equalizer output is higher than a positive tracking threshold, wherein a negative signal is generated if the equalizer output is lower than a negative tracking threshold.

15. A system for generating gain errors, comprising:
a circuit for receiving an output of an equalizer;
a circuit for comparing a magnitude of the output to a saturation threshold level;
a circuit for generating a first gain error if the output is higher than the saturation threshold level; and
either a slicer or a trellis for generating a second gain error, wherein the slicer generates a gain error based on an output of an interpolator, wherein the trellis generates a gain error based on an output of a maximum likelihood detector.

16. A system as recited in claim 15, wherein the output from the equalizer is an equalized waveform of a tape readback signal.

17. A system as recited in claim 15, further comprising logic for using one of the gain errors to adjust a gain of an analog signal.

18. A system as recited in claim 17, wherein the first gain error is used to adjust the gain of the analog signal if the output of the equalizer is higher than the saturation threshold level, wherein the second gain error is used to adjust the gain of the analog signal if the output of the equalizer is lower than the saturation threshold level.

19. A system for generating gain errors, comprising:
a circuit for receiving an output of an equalizer; and
a circuit for comparing a magnitude of the output to a saturation threshold level;
a circuit for generating a first gain error if the output is higher than the saturation threshold level;
a circuit for generating a threshold qualified peak from the equalizer output and a tracking threshold level;
a circuit for comparing the threshold qualified peak to a second threshold; and
a circuit for generating a third gain error based on the comparison of the threshold qualified peak and the second threshold.

20. A system as recited in claim 19, wherein the output from the equalizer is an equalized waveform of a tape readback signal.

21. A system as recited in claim 19, further comprising logic for using one of the gain errors to adjust a gain of an analog signal.

22. A system as recited in claim 21, wherein the first gain error is used to adjust the gain of the analog signal if the output of the equalizer is higher than the saturation threshold level, wherein the third gain error is used to adjust the gain of the analog signal if the output of the equalizer is lower than the saturation threshold level.

23. A system as recited in claim 19, further comprising either a slicer or a trellis for generating a second gain error, wherein the slicer generates a gain error based on an output of an interpolator, wherein the trellis generates a gain error based on an output of a maximum likelihood detector, wherein the first gain error is used to adjust the gain of the analog signal if the output of the equalizer is higher than the saturation threshold level, wherein either the second or the third gain error is used to adjust the gain of the analog signal if the output of the equalizer is lower than the saturation threshold level.

* * * * *